US008937119B2

(12) United States Patent
Amiel et al.

(10) Patent No.: US 8,937,119 B2
(45) Date of Patent: Jan. 20, 2015

(54) STABILIZED DRIER FOR ALKYD-BASED COMPOSITIONS

(75) Inventors: Pat Amiel, Kleinburg (CA); Alison Crumblehulme, Burlington (CA); Ruben Lenz, Milton (CA); Pierre W. I. Ndalamba, Hamilton (CA); Loren Peng, Waterloo (CA); Sachin Sathe, Brampton (CA); Enrique Troncoso, Burlington (CA); Tony Vaccariello, Aurora, OH (US); Yao Wang, Milton (CA)

(73) Assignee: Lorama, Inc., Milton, Ontario (CA)

( * ) Notice: Subject to any disclaimer, the term of this patent is extended or adjusted under 35 U.S.C. 154(b) by 307 days.

(21) Appl. No.: 13/128,504

(22) PCT Filed: Nov. 12, 2008

(86) PCT No.: PCT/CA2008/001977
§ 371 (c)(1),
(2), (4) Date: Aug. 26, 2011

(87) PCT Pub. No.: WO2010/054461
PCT Pub. Date: May 20, 2010

(65) Prior Publication Data
US 2011/0301289 A1    Dec. 8, 2011

(51) Int. Cl.
*B01J 31/22*    (2006.01)

(52) U.S. Cl.
CPC .......... *B01J 31/2213* (2013.01); *B01J 2231/70* (2013.01); *B01J 2531/0272* (2013.01); *B01J 2531/23* (2013.01); *B01J 2531/26* (2013.01); *B01J 2531/38* (2013.01); *B01J 2531/48* (2013.01); *B01J 2531/72* (2013.01); *B01J 2531/842* (2013.01)

USPC .............................. 524/48; 524/601; 502/159

(58) Field of Classification Search
USPC .................................... 524/48, 601; 502/159
See application file for complete search history.

(56) References Cited

U.S. PATENT DOCUMENTS 5,492,615 A    2/1996 Houman
5,567,747 A    10/1996 Cappuccio et al.
(Continued)

FOREIGN PATENT DOCUMENTS

EP    1 382 648    1/2004

OTHER PUBLICATIONS

Chen, M., et al., "Study of inclusion complex of beta-cyclodextrin and nitrobenzene," Chemosphere, 2006, 63, 522-529.*
(Continued)

*Primary Examiner* — Liam J Heincer
*Assistant Examiner* — Nicholas Hill
(74) *Attorney, Agent, or Firm* — B. Aaron Schulman, Esq.; Stites & Harbison, PLLC.

(57) ABSTRACT

The present invention relates to a stabilized drying catalyst ('drier') for enhancing or accelerating oxidative air-drying of an alkyd-based composition, comprising an inclusion complex of a cyclodextrin and a metal salt of formula $(M^{x+})k (R^{k-})_x$, wherein M is a transition or rare earth metal cation with charge x and R is an anion with charge k. The present invention preserves the catalytic activity of a drier, particularly upon addition to an alkyd composition, thus providing a method for stabilizing the drying time of the alkyd composition. A process for preparing the stabilized drier is also provided.

27 Claims, 13 Drawing Sheets

(56) References Cited

U.S. PATENT DOCUMENTS 5,759,252 A 6/1998 Edelmann et al.
2005/0245639 A1 11/2005 Oostveen et al.

OTHER PUBLICATIONS

EPO Search Report dated Jun. 5, 2012 regarding EP 08878054.9.
J. Colloid and Interface Science, vol. 328, No. 2, Sep. 4, 2008, pp. 391-395.
J. Mol. Structure, vol. 644, Jan. 1, 2003, pp. 49-53.
J. Rare Earths, vol. 25, Jun. 1, 2007, pp. 24-29.
Bieleman, J. and Lomolder, R., "Chapter 7: Catalytically Active Additives" in Additives for Coatings, J. Bieleman (ed.), Wiley-VCH (2000).
The Chemistry and Physics of Coatings, $2^{nd}$ ed. Editor: A. R. Marrion. Royal Society of Chemistry, 2005.
Surface Coatings. Ed. S. Paul. John Wiley & Sons, 1996.
Bieleman, J. Cobalt Carboxylate Driers for Paints, Cobalt News, (Jan. 2004), The Cobalt Development Institute, U.K.
Van Gorkum, Remy and E. Bouwman, "The oxidative drying of alkyd paint catalyzed by metal complexes." Coordination Chemistry Reviews 249 (2005) 1709-1728.
Micciche, F. et al. "The combination of reducing agents/iron as environmentally friendlier alternatives for Co-based driers in the drying of alkyd paints." Progress in Organic Coatings. 53(2), Jun. 2005, pp. 99-105.
International Search Report dated Jul. 27, 2009 regarding PCT/CA2008/001977.

\* cited by examiner

STABILIZED DRIER FOR ALKYD-BASED COMPOSITIONS

This application is the National Stage of International Application No. PCT/CA2008/001977, filed Nov. 12, 2008. The contents of the above application is incorporated by reference in its entirety.

FIELD OF INVENTION

The present invention relates to a stabilized drier composition for oxidative air drying of alkyd-based compositions.

BACKGROUND OF INVENTION

Air-drying alkyd compositions have many useful applications in various types of coatings. Examples of coatings include inks, paints, resins, and surface coatings such as linoleum. Alkyd compositions contain polymers formed from the reaction of an unsaturated oil or unsaturated fatty acid, polyalcohol(s) and polyacids (or corresponding anhydrides, and usually one or more carrier solvents for the polymers. Alkyds are typically applied as a liquid coating onto a surface or substrate. The coating oxidizes upon exposure to air, eventually forming a solidified coating on the surface. Ambient cure alkyd compositions can air dry to its solidified form at ambient temperature (i.e. without the addition of heat).

Oxidative air drying of an alkyd composition is due to autoxidation and cross-linking of the unsaturated oil/fatty acid component of the alkyd composition, and simultaneous evaporation of the carrier solvent(s). Absorption of oxygen from the air causes peroxide formation and peroxide decomposition, which results in the generation of free radicals (see Scheme 1(a) and (b) below) (Bieleman, J. and Lomolder, R. "Chapter 7: Catalytically Active Additives" in *Additives for Coatings*, J. Bieleman (ed.) Wiley-VCH (2000)). The free radicals initiate cross-linking and formation of higher molecular weight polymers, eventually leading to a solidified "air dried" film or coating.

Scheme 1: (a) Schematic presentation of the autoxidation process of alkyds

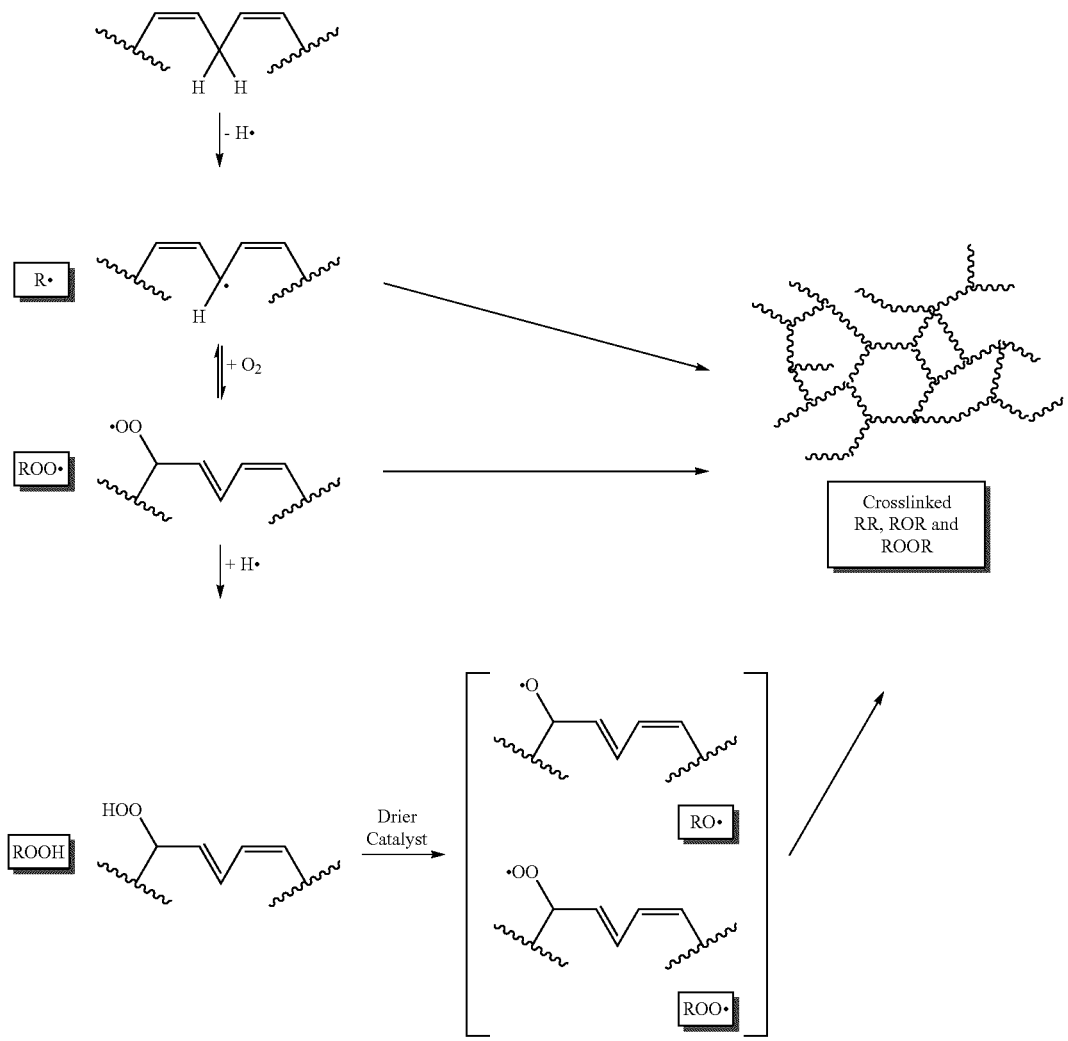

Scheme 1(b): Reactions during autoxidation cross-linking of alkyds

Initiation:
RH ⟶ R• + H•

Propagation:
R• + O₂ ⟶ ROO•

ROO• + RH ⟶ ROOH + R•

ROOH + M$^{n+1}$ ⟶ ROO• + M$^{n+}$ + H$^+$

ROOH + M$^{n+}$ ⟶ RO• + M$^{n+1}$ + OH$^-$

Termination:
2 ROO• ⟶ ROOR + $^1$O₂

2 ROO• ⟶ ROH + R=O + $^1$O₂

The time for an alkyd composition to dry depends on the concentration and the type of unsaturated oil used to prepare the alkyd composition. Autoxidation and crosslinking of the unsaturated oil/fatty acid component can proceed unaided, but the time for drying is generally found to be unacceptably long. The reactions are significantly accelerated by the presence of a metal-based drying catalyst, commonly referred to as a "drier". Without the presence of a drying catalyst, the alkyd coating would likely take a number of months to dry. In the presence of a drying catalyst, drying can be accomplished within a few hours. The metal within the drying catalyst catalyzes autoxidation by forming a complex with both atmospheric oxygen and the double bonds of the unsaturated fatty acid groups within the alkyd composition.

The catalytic activity of the transition metal during decomposition of the hydroperoxide (ROOH in Scheme (b)) relies on the repeated transition of the metal ion from the lower to the higher oxidation state and back again, leading to reduction and oxidation of the hydroperoxides catalyze and accelerate oxidation of the unsaturated oil component of the composition. Transition metals are most commonly employed in such driers, as transition metals are capable of undergoing a transition from a lower valence state to a higher valence state in a redox reaction with fatty acid peroxides present in the alkyd composition.

In the past, organic lead salts have been used, but due to their toxicity, lead-based driers have been replaced with driers based on other transition metals such as cobalt, manganese, iron, cerium and vanadium. At present, cobalt carboxylate salts are the most widely used drier in air-drying alkyd coatings. Cobalt-based driers are popular since the drying process is effectively accelerated with low concentrations of cobalt present.

Commonly used transition metal driers are carboxylate salts, having the general formula M$^{x+}$[(RCOO)$^{-1}$]$_x$, wherein M represents the transition metal with valence x and R represents an aliphatic (typically C$_6$-C$_{18}$) carboxylate group. The carboxylate group stabilizes the transition metal and also allows solubilization and even distribution of the drier throughout the alkyd composition, which typically includes one or more organic solvents to solubilize the various components of the composition. A typical example of such a drier is described in U.S. Pat. No. 5,759,252. Additional examples are described in Bieleman, J. and Lomolder, R., "Chapter 7: Catalytically Active Additives" in *Additives for Coatings*, J. Bieleman (ed.), Wiley-VCH (2000).

Commercially available driers can consist of an individual primary drier or contain a combination of different driers, with a primary drier responsible for the catalytic activity, and one or more auxiliary driers and/or coordination driers. Auxiliary driers interact with the primary drier. Coordination driers form coordination complexes with hydroxyl groups within the alkyd composition and thus help to stabilize the polymer network of the alkyd composition. Auxiliary and/or coordination driers are typically based on barium, zirconium, calcium, bismuth, zinc, potassium, strontium and lithium. Auxiliary and coordination driers are added to enhance the activity of the primary drier and the final characteristics of the dried coating (e.g. hardness, glossiness).

The metal ion of the primary drier depends upon factors such as activity of the drier at ambient temperature, possible colouring effects (important in paint applications), toxicity, the type of alkyd composition in question, and cost.

In general, commercially available transition metal driers have poor storage stability, particularly upon addition to the compositions to be dried. Upon exposure to water and oxygen in the atmosphere and/or within the composition to be dried, the transition metal tends to change oxidation state, thus losing its catalytic activity over time. As a result, the drying time of the alkyd composition containing the drier tends to increase the longer the alkyd composition is kept on storage, The increase in drying time of the alkyd composition, over time, is referred to as a "loss of dry time stability".

Alkyd compositions prepared as water-in-oil emulsions or oil-in-water emulsions are particularly prone to the problem of loss of dry time stability, due to deactivation of the drier in the presence of water. In these emulsions, the drier is distributed within the water phase. However, the drier is rapidly deactivated in the water phase, due to complexation with other water-soluble components, such as pigment molecules, and hydrolysis of the metal salts. This also results in an uneven distribution of the drier in the oil phase after evaporation of the water phase.

Cobalt-based driers provide good catalytic activity at ambient temperature and are the most commonly used driers in ambient cure alkyd compositions. Cobalt carboxylate salts are the most commonly used form. However, upon addition to the alkyd composition, the catalytic activity of the cobalt salts decreases over time. Also, cobalt is suspected to be toxic.

Attempts have been made in the past to improve the shortcomings of known transition metal driers. International patent application WO 2003/093384 discloses a drier composition for an air-drying alkyd based coating, comprising a transition metal salt and a reducing biomolecule which is capable of undergoing a transition metal catalyzed oxidation, to prolong the catalytic activity of the transition metal drier. European Patent Application No. 1 382 648 A1 discloses a drier for air drying alkyd based coating, which is based on a transition metal selected from a group that does not include cobalt.

For an acceptable drying time, an alkyd composition containing a transition metal drier should be used soon after preparation and consequent exposure to the atmosphere. This represents an inconvenience to the consumer (i.e. the end user). Also, there can be significant wastage of product that is no longer deemed useable, i.e. the alkyd composition has such a long ambient drying time as to render it unfeasible to use. This poses problems for both the consumer and the manufacturer, as well as the environment.

Accordingly, there is a need for alternative driers for alkyd compositions with improved stability, which can provide better dry time stability in alkyd compositions. There is also a need for less toxic and more environmentally friendly alternatives to currently available driers.

SUMMARY OF INVENTION

In accordance with a broad aspect of the present invention there is provided a stabilized drier for an oxidatively air-drying alkyd based composition, comprising an inclusion complex of a cyclodextrin and a metal salt of formula (I):

$$(M^{x+})_k(R^{k-})_x \qquad (I)$$

wherein M is a cation of a metal, with a charge x, and R is an anion with charge k, wherein said anion is selected from the group consisting of nitrates, sulfates, phosphates, oxalates, salicylates, carboxylates, naphthenates, an anion of ethylenediaminetetraacetic acid (EDTA), an anion of diethylenetriaminepentaacetic acid (DTPA), an anion of nitrilotriacetic acid (NTA), amino acids, perchlorates, borates, octoates, resinates, neodecanoates, tallates and linoleates.

In an embodiment of the invention, the metal of formula (I) is selected from the group consisting of cobalt, manganese, iron, vanadium, copper, lead, cerium, and rare earth metals. In a further embodiment of the invention, the metal is cobalt.

In another embodiment of the invention, the metal of formula (I) is selected from the group consisting of zirconium, zinc, aluminum, barium, calcium, bismuth, potassium, strontium and lithium.

In an embodiment of the invention, in formula (I), R is an $C_6$-$C_{18}$ aliphatic carboxylate group and k is 1. R can be 2-ethylhexanoate.

The cyclodextrin used as to form the inclusion complex may be selected from the group consisting of α-cyclodextrins, β-cyclodextrins, γ-cyclodextrins, and derivatives thereof. In a preferred embodiment of the invention, the cyclodextrin is a γ-cyclodextrin or a derivative thereof.

In another broad aspect of the invention, there is provided a process for preparing a stabilized drier for an oxidatively air-drying alkyd based composition, comprising:
  (a) dissolving a cyclodextrin in a hydrophilic solvent to form a solution;
  (b) adding a metal salt of formula (I) as described above to the solution of step (a) so that an inclusion complex of said cyclodextrin and said metal salt is formed; and
  (c) optionally isolating said inclusion complex from said solution.

In an embodiment of the invention, the hydrophilic solvent is water or an aqueous solution.

In another aspect of the invention, there is provided a stabilized drier prepared by the process provided above.

In yet another broad aspect of the invention, there is provided a use of the stabilized drier as described above, for accelerating oxidative air-drying of an alkyd based composition, comprising addition of a stabilized drier to said alkyd based composition, wherein the metal of said stabilized drier is selected from the group consisting of cobalt, manganese, iron, vanadium, copper, lead, cerium, and rare earth metals. The use may be further enhanced by addition of one or more stabilized driers wherein the metal of said stabilized drier is selected from the group consisting of zirconium, zinc, aluminum, barium, calcium, bismuth, potassium, strontium and lithium.

In another broad aspect of the invention, there is provided a method for stabilizing drying time of an oxidatively air-drying alkyd based composition, comprising the steps of:
  (a) dissolving a cyclodextrin in a hydrophilic solvent to form a solution;
  (b) adding a metal salt of formula (I) as described above to the solution of step (a) to form a mixture comprising a stabilized drier, wherein said stabilized drier is an inclusion complex of said cyclodextrin and said metal salt;
  (c) optionally isolating said stabilized drier; and
  (d) adding said stabilized drier to said air drying alkyd based composition with mixing.

In an embodiment of the method, the hydrophilic solvent is water or an aqueous solution.

In the above-noted method, the metal of formula (I) is preferably selected from the group consisting of cobalt, manganese, iron, vanadium, copper, lead, cerium and rare earth metals. In a preferred embodiment, the selected metal is cobalt. The method of stabilizing drying time may further comprise one or more additional stabilized driers, wherein the metal of formula (I) is selected from the group consisting of zirconium, zinc, aluminum, barium, calcium, bismuth, potassium, strontium and lithium.

For enhancing the drying of an alkyd based composition that comprises water or a hydrophilic solvent, step (c) may be omitted before addition of the stabilized drier(s) to said alkyd based composition.

For enhancing the drying of an alkyd based composition that is hydrophobic and excludes water or a hydrophilic solvent, the stabilized drier may be isolated before addition to said alkyd based composition.

An advantage of the present invention is that it provides a stabilized drier that has improved drying performance and dry time stability for air-drying alkyd compositions. The cyclodextrin inclusion complex protects the drier from premature oxidation and hydrolysis, resulting in decreased dry time compared to the drier alone, and improved dry time stability.

The stabilized drier is simple to prepare and provides an efficient and inexpensive means of improving drying performance of driers, and providing dry time stability in ambient cure (air-drying) alkyd compositions containing driers.

The present invention may be added to any alkyd based composition which comprise fatty acids that oxidize upon air drying (i.e. air-drying fatty acids). The stabilized drier may be added as a solution, liquid suspension or a solid to the alkyd composition to be dried. In addition, the stabilized drier is stable to physical stress and thus may be added to an alkyd composition via processes which involve physical stress, such as high shear blending, and solid blending or milling processes, without significant loss of activity.

The present invention can be prepared separately from the alkyd composition to be dried. Thus, the present invention may be used in a wide variety of alkyd compositions, including compositions containing water or hydrophilic solvents. The present invention stabilizes the dry time of alkyd compositions comprising water-in-oil and oil-in-water emulsions, which are particularly prone to loss of dry time stability. Such emulsions are commonly used to prepare paints, enamels and other air-dry ambient cure coatings.

The present invention may be added to the alkyd composition to be dried, as either a solid (e.g. isolated inclusion complex as a powder) or in liquid form (e.g. as a solution or a liquid suspension). In a preferred embodiment, if the alkyd composition to be dried contains only hydrophobic solvent, the stabilized drier of the invention to be added to said composition is in a solid form. In another preferred embodiment, if the alkyd composition to be dried comprises a hydrophilic solvent, the stabilized drier of the invention to be added is in hydrophilic solution or a suspension within a hydrophilic solvent. Preferably, the hydrophilic solvent is water or an aqueous solution thereof.

By stabilizing the drier, a lower concentration of drier may be added to the alkyd composition to be dried. This is of benefit to both the end user and the environment, since commercially available driers are typically toxic. In addition, alkyd compositions comprising the stabilized drier are less toxic to apply, since the transition metal is sequestered by cyclodextrin. The present invention provides an environmental and safety benefit as the sequestration of the transition metal by cyclodextrin allows for easier isolation of the metal in cleaning and recycling processes.

Commercially available driers are often used in combination with drier accelerators/activators. Drier accelerators typically include dinitrogen ligands, such as 2,2'-bipyridyl (e.g. DRI-RX®, OM Group Inc.) and 1,10-phenanthroline (e.g. ACTIV-8®, R.T. Vanderbilt Co. Inc.). Combinations of driers with drier accelerators are more stable to hydrolysis and/or oxidation than the drier alone, particularly driers composed of metal carboxylate salts. However, dinitrogen ligands tend to be toxic and/or mutagenic. The present invention stabilizes a wide variety of driers, including driers comprising carboxylate salts of metals. As the present invention stabilizes and extends the catalytic lifetime of metal salts such as metal carboxylate salts, such driers can be used in preference to driers used in combination with dinitrogen ligands. Thus, exposure to toxic compounds can be reduced or avoided with the use of the present invention.

Other and further advantages and features of the invention will be apparent to those skilled in the art from the following detailed description of an embodiment thereof, taken in conjunction with the accompanying drawings.

BRIEF DESCRIPTION OF DRAWINGS

The present invention will be further understood from the following detailed description of an embodiment of the invention, with reference to the drawings in which.

Figure 1A:
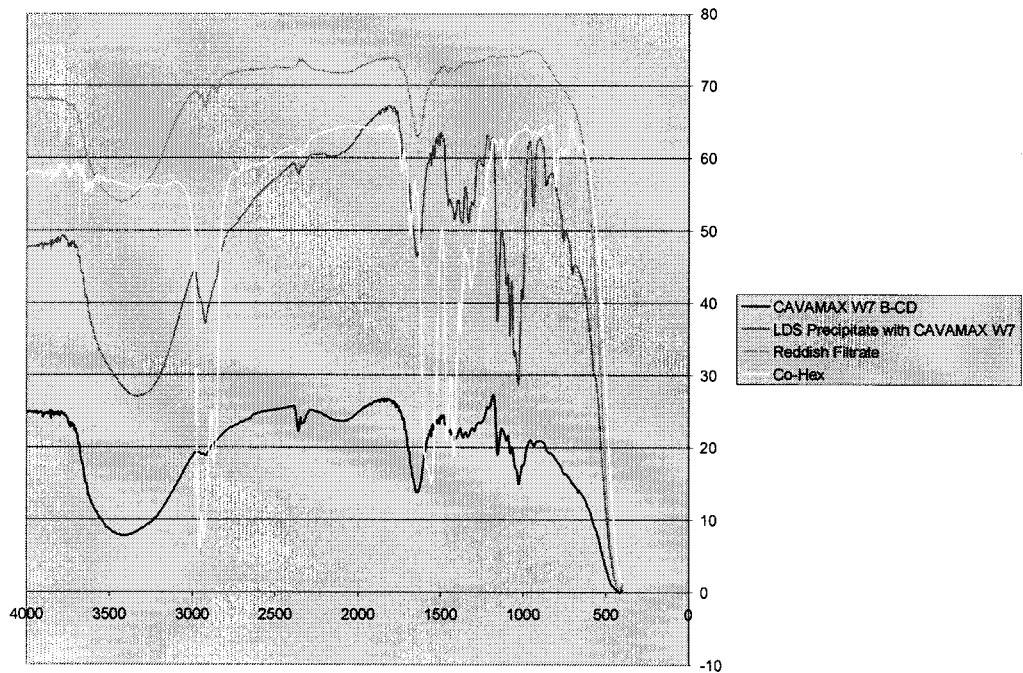
FIG. 1 is the Fourier transform infrared (FTIR) spectra of the cyclodextrin-drier inclusion complexes prepared as described in Example 2, compared with the cyclodextrin alone and the drier alone (unstabilized), as follows:
(a) β-cyclodextrin+cobalt drier ("LDS precipitate with CAVAMAX W7"), β-cyclodextrin alone ("CAVAMAX W7 B-CD"), reddish-orange aqueous phase ("Reddish Filtrate"), colloid phase (as noted), and cobalt drier alone ("Co-Hex");
(b) γ-cyclodextrin+cobalt drier ("LDS with Gamma CD"), cobalt drier alone ("Cobalt"), and γ-cyclodextrin alone ("CD");
(c) γ-cyclodextrin+calcium drier ("Ca-complex"), calcium drier alone ("Ca-CEM"), and γ-cyclodextrin alone ("CD");
(d) γ-cyclodextrin+manganese drier ("Mn complex"), manganese drier alone ("Mn-CEM"), and γ-cyclodextrin alone ("CD");
(e) γ-cyclodextrin+zirconium drier ("Zr LDS"), zirconium drier alone ("Zr-Hex"), and γ-cyclodextrin alone ("CD");
(f) γ-cyclodextrin+iron drier ("Fe-Complex"), iron drier alone ("Fe-Octoate"), and γ-cyclodextrin alone ("CD");
(g) γ-cyclodextrin+cerium drier ("Ce complex"), cerium drier alone ("Ce Hex"), and γ-cyclodextrin alone ("CD");
(h) γ-cyclodextrin+rare earth drier ("Rare Earth Complex"), rare earth drier alone ("Rare Earth Hex"), and γ-cyclodextrin alone ("CD"); and
(i) γ-cyclodextrin+zinc drier ("Zn Complex"), zinc drier alone ("Zn Hex"), and γ-cyclodextrin alone ("CD")
Figure 1B:
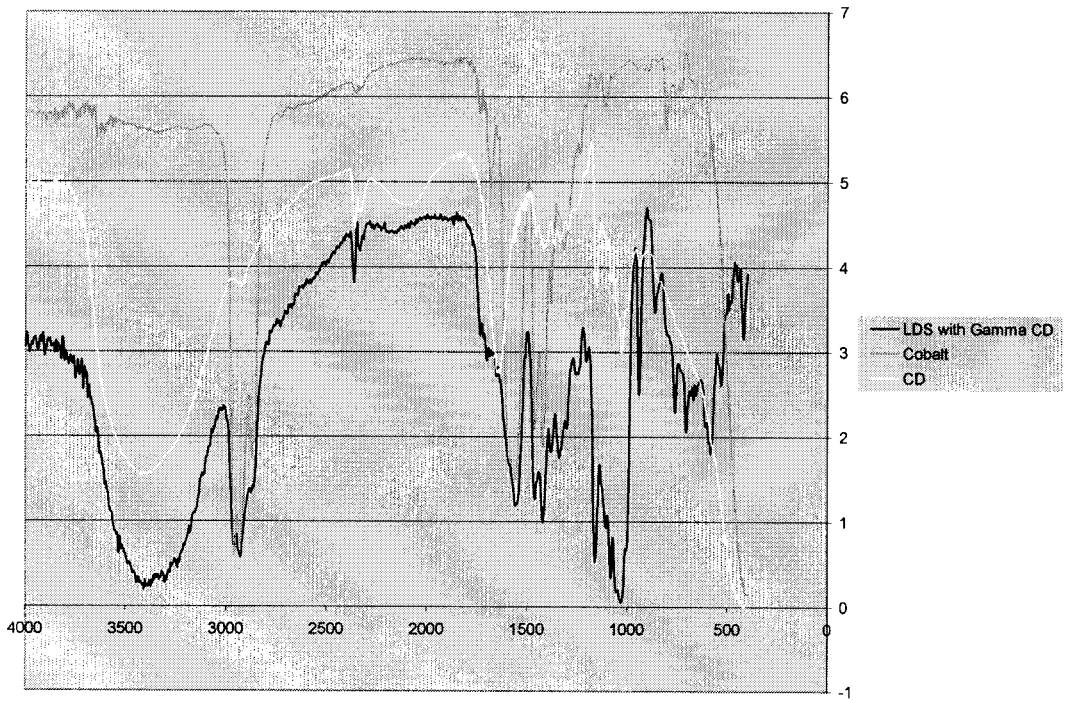
Figure 1C:
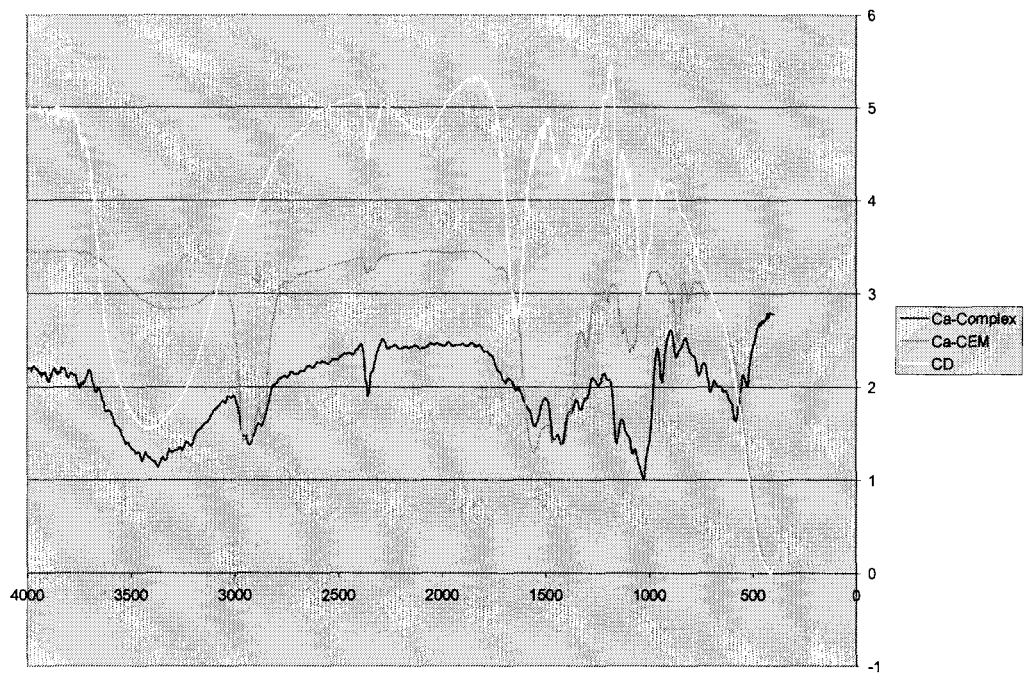
Figure 1D:
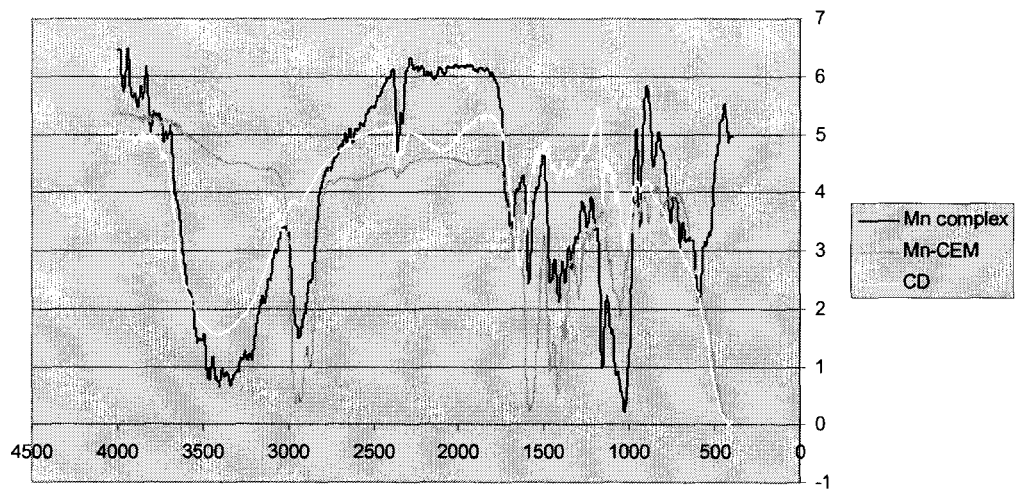
Figure 1E:
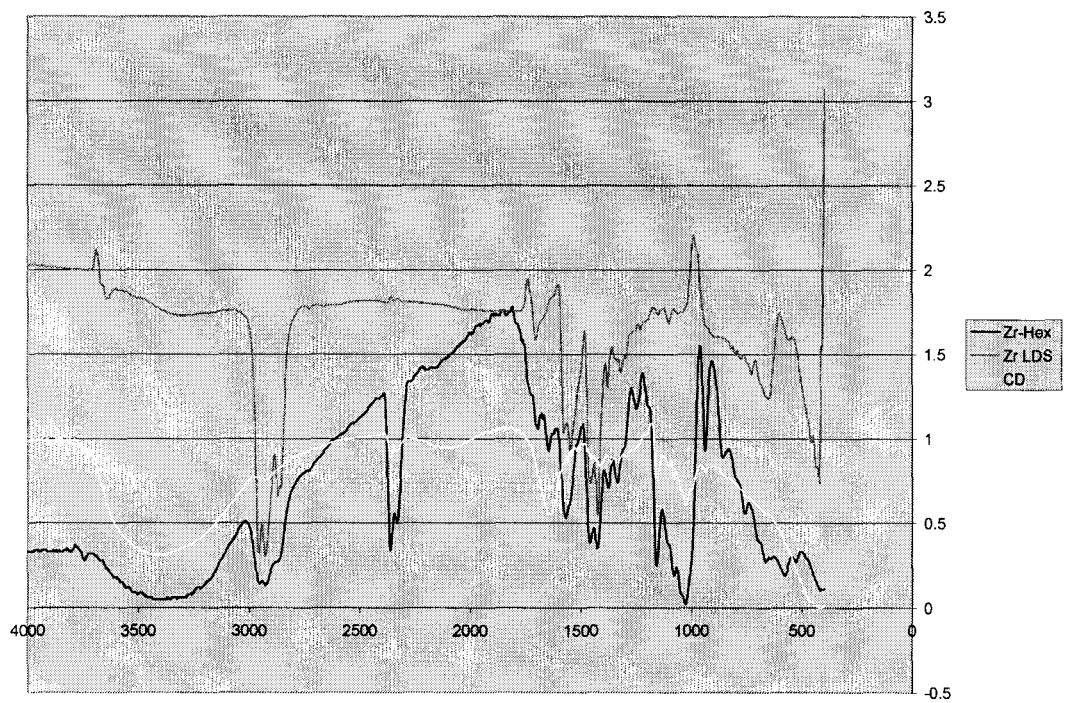
Figure 1F:
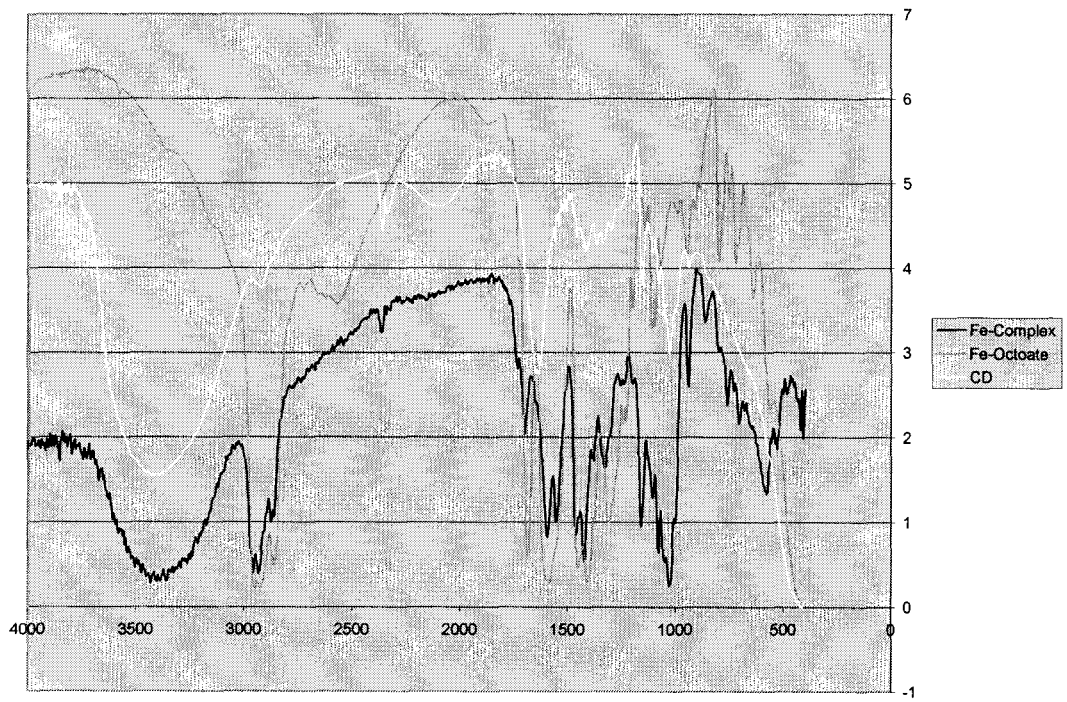
Figure 1G:
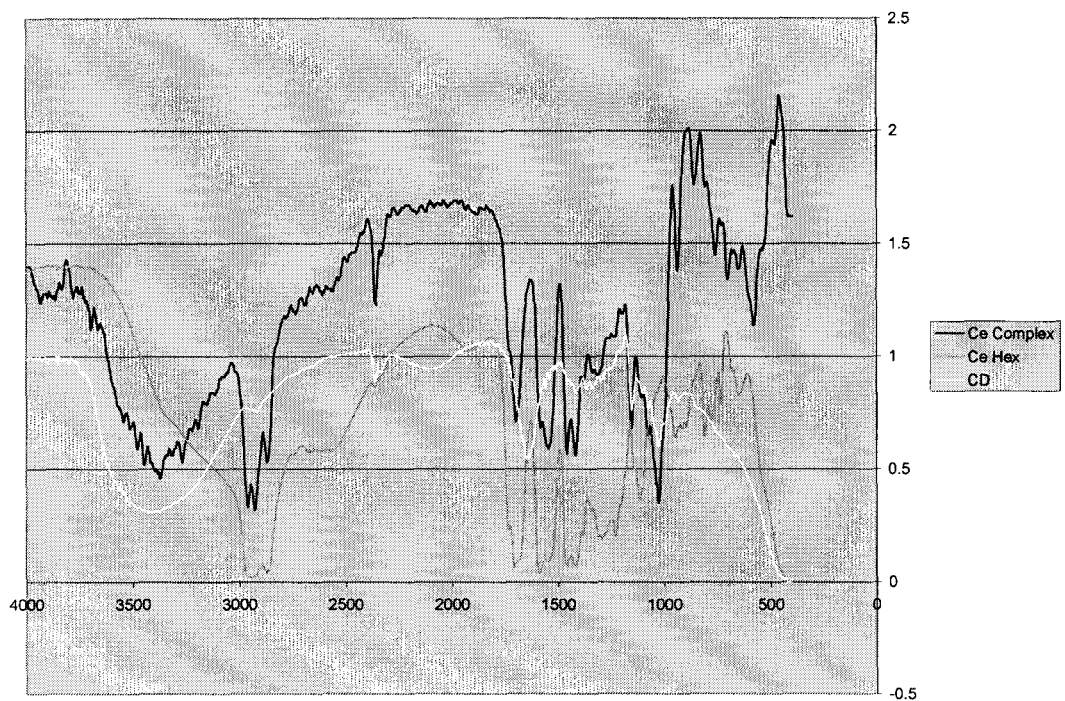
Figure 1H:
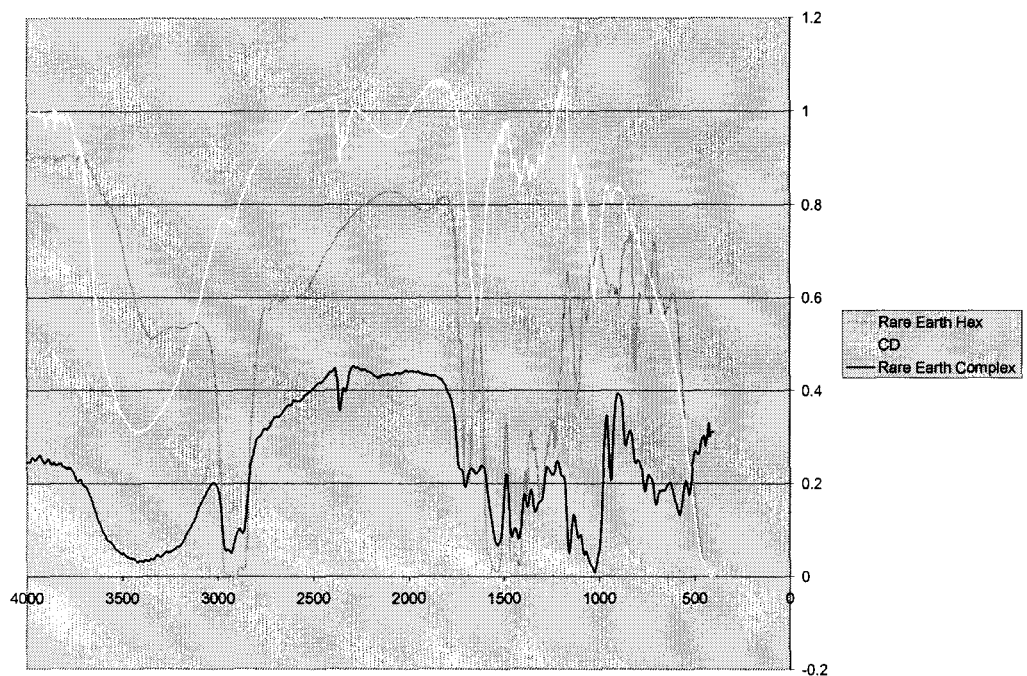
Figure 1I:
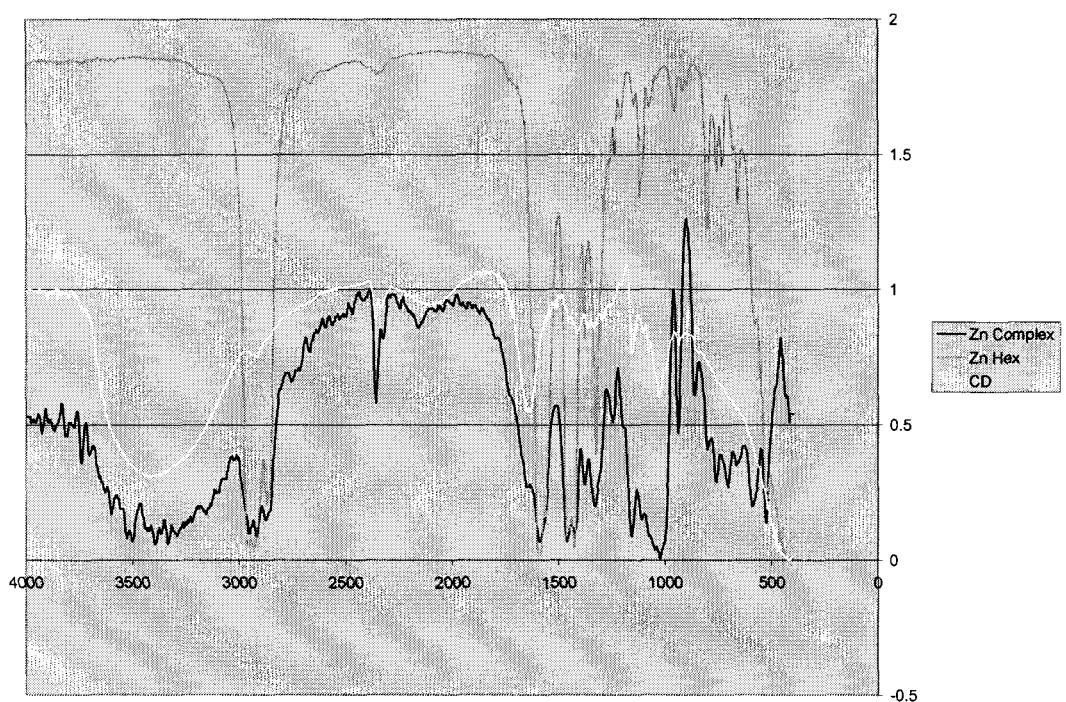

(e) stabilized cobalt drier in powder form added to high solids white alkyd enamel (composition as per Example 3.1.5) (collectively, "LDS Powder");
(f) stabilized cobalt drier in powder form added to high solids black alkyd enamel (composition as per Example 3.1.6) (collectively, "LDS Powder"); and
(g) stabilized cobalt drier in liquid suspension form added to alkyd emulsion enamel (composition as per Example 3.1.7) (collectively, "LDS Liquid").

Throughout the drawings, the following abbreviations are used: "CD" for γ-cyclodextrin, "LDS" for Lorama® drier stabilizer; and "Std" for "Standard".

DETAILED DESCRIPTION OF INVENTION

It has now been discovered that a drier comprising cyclodextrin inclusion complexes of transition metals has an improved stability and provides a stabilized dry time in alkyd compositions employing the drier.

aqueous solution, a cyclodextrin ring forms a toroidal structure (Scheme 2(b)), presenting the hydroxyl groups of the glucopyranoside units to the aqueous environment.

The exterior of the cyclodextrin is sufficiently hydrophilic to allow water solubility. The interior of the cyclodextrin ring is less hydrophilic compared to the exterior of the ring. This effect is particularly pronounced when the cyclodextrin ring is in an aqueous environment, wherein the interior of the cyclodextrin ring forms a hydrophobic cavity relative to the aqueous environment outside the ring. The interior of the cyclodextrin ring is large enough to host other molecules as "guest" molecules. Hydrophobic molecules will prefer to enter the interior of the cyclodextrin ring, as it is a more energetically favourable environment to exist in than the highly polar aqueous environment. Thus, cyclodextrins are capable of forming stable inclusion ("host-guest") complexes with hydrophobic molecules.

Scheme 2

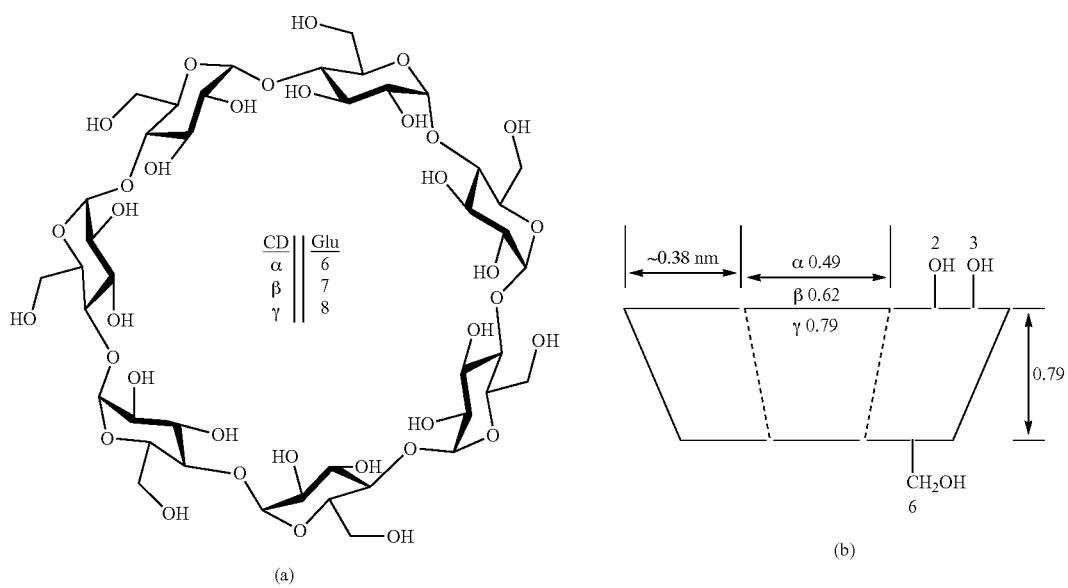

Cyclodextrins are a family of cyclic oligosaccharides composed of five or more α-D-glucopyranoside units linked C1 to C4. Cyclodextrins occur naturally and may also be prepared by enzymatic conversion of starches, typically by treatment of starch with α-amylase, then cyclodextrin glycosyltransferase. The most common cyclodextrin oligomers contain six to eight units in a ring, denoted as a α-cyclodextrin (six sugar units), β-cyclodextrin (seven sugar units) and γ-cyclodextrin (eight sugar units).

Scheme 2 below shows (a) a flat chemical structure representation of a cyclodextrin molecule and (b) a cross-section of the toroid formed by a cyclodextrin molecule and the dimensions of the toroid in nanometres (nm). As can be appreciated, the size of the cavity increases with the size of the cyclodextrin oligomer.

In general, cyclodextrins are water soluble due to the presence of the hydroxyl groups on each glucopyranoside unit. In The formation of inclusion compounds may be used to modify the physical and chemical properties of the guest molecule, particularly with regard to water solubility. As a result, inclusion complexes of active compounds with cyclodextrins have been used in various applications, such as pharmaceutical applications, environmental applications and the food industry. For example, sequestration of a drug molecule inside the cyclodextrin cavity can enable delivery of a drug in novel formulations that would otherwise be difficult to prepare with the free drug. Another example of cyclodextrin use is in controlled release or targeted release pharmaceutical formulations. Inclusion compounds of cyclodextrin hosting a biologically active molecule as the guest, will release the guest molecule under specific conditions, thus allowing targeting of the biologically active molecule to specific organs or tissues.

In environmental applications, cyclodextrins may be used to sequester undesirable compounds, including toxins (e.g. organic compounds, heavy metals) and fragrance molecules. Febreze® (Proctor & Gamble Co., U.S.A.), an odour eliminator for household use, is a well-known application of cyclodextrins. Malodorous organic (typically hydrophobic) molecules form inclusion complexes with the cyclodextrin component of Febreze®, such that their scent is no longer detectable.

Addition of cyclodextrin to a composition containing organic metal compounds is known to have a protective effect on the activity of the metal (see for example, U.S. Pat. Nos. 5,567,747 and 5,492,615). However, in previously known applications, cyclodextrin is added directly to the composition, thus forming inclusion complexes in situ. However, a hydrophilic environment is be required for the inclusion complex formation as the hydrophobic cavity of cyclodextrin thus appears as a more energetically favourable environment for the organic metal compound to exist in. Thus, the use of cyclodextrin for its protective effect has been limited to hydrophilic (typically aqueous) compositions.

It has now been discovered that an inclusion complex of cyclodextrin and transition/rare earth metal drier provides both improved dry time and dry time stability over the unprotected drier, when added to an alkyd composition. A stabilized drier is defined herein as an inclusion complex of a cyclodextrin and a metal drier. The dry time of the alkyd composition containing the stabilized drier is less than the same composition containing the free (unstabilized) drier. Moreover, the dry time of the alkyd composition of the stabilized drier remains relatively stable during extended storage, and does not increase as dramatically as the same alkyd composition containing an unstabilized drier.

The inclusion complex of cyclodextrin and the drier has the dual effect of protecting a metal drier from a change in valence state, thus preserving and/or prolonging its catalytic activity, while still allowing the drier to perform catalysis of autoxidation and cross-linking of the unsaturated fatty acid/oil component of an alkyd composition.

Preferably, the inclusion complex comprises γ-cyclodextrin and optionally, one or more other oligomers of cyclodextrin or derivatives thereof. Other oligomers of cyclodextrin include α-cyclodextrins and β-cyclodextrins. In yet another preferred embodiment, the inclusion complex is formed with a γ-cyclodextrin or a derivative thereof.

Typical primary driers comprise a transition metal salt and/or transition metal complexes. Rare earth metals (scandium, yttrium, and the lanthanoids, such as cerium) may also be used to catalyze air-drying of alkyds, as such metals are capable of transitions in valence state. Thus, the inclusion complex can comprise as a guest molecule, any transition or rare earth metal salt, or a transition metal complex or rare earth metal complex that is capable of catalyzing autoxidation and cross-linking of an alkyd composition, the two reactions which occur during air-drying of the alkyd composition. Typical primary driers are based on one or more transition metals including cobalt (Co), vanadium (V), manganese (Mn), iron (Fe), nickel (Ni), and one or more rare earth metals such as cerium (Ce). Any drier may be stabilized by the present invention.

The inclusion complex may also comprise as a guest molecule, any metal salt that enhances the activity of the primary drier, such as auxiliary and coordination driers. Auxiliary and coordination driers based on metals such as barium, zirconium, calcium, bismuth, zinc, potassium, strontium and lithium, are used to enhance the activity of the primary drier and the final characteristics of the dried coating (e.g. hardness, glossiness). Auxiliary and coordination driers comprising transition metals may also be prone to oxidation and decomposition. Thus, the present invention may also be used to stabilize auxiliary and coordination driers.

In the present invention, a drier comprises a metal salt of formula $(M^{x+})_k(R^{k-})_x$, wherein M is a cation of a metal, with charge x, and R is a ligand with charge k, wherein said ligand is selected from the group consisting of nitrates, sulfates, phosphates, oxalates, salicylates and other carboxylates, napthenates, ethylenediamine tetraacetic acid (EDTA), diethylene triamine pentaacetic acid (DTPA), nitrilotriacetic acid (NTA), amino acids, octoates, neodecanoates, tallates, linoleates, and combinations thereof.

The metal salt may be further surrounded by one or more complexing agents or neutral ligands, comprising one or more uncharged organic molecules.

In an embodiment of the invention, the drier employed in the present invention is a $C_6$-$C_{18}$ aliphatic carboxylate salt of a transition metal or a rare earth metal. In another embodiment, the ligand is an aliphatic carboxylate anion such as 2-ethylhexanoate. In a further preferred embodiment, the drier is cobalt bis(2-ethylhexanoate) or cerium bis(2-ethylhexanoate).

The present invention can comprise inclusion complexes of one or more different cyclodextrins or derivatives thereof, and one or more different driers, comprising one or more different metal salts and/or metal complexes. Guidelines for selection of a suitable drier and drier combinations may be found in, for example, *The Chemistry and Physics of Coatings* $2^{nd}$. ed., ed. A. R. Marrion, Royal Society of Chemistry, 2005. Upon selection of the drier(s) for a given alkyd composition, a cyclodextrin may be selected in order to optimize the yield of inclusion complex formed. Selection of a cyclodextrin is preferably made according to the size of the internal cavity as well as any derivative groups that affect the relative hydrophobicity, in order to maximize the yield of inclusion complex formed.

In an embodiment of the invention, the inclusion complex is formed in a hydrophilic solvent, by first dissolving the cyclodextrin in the solvent before addition of the drier compound. Preferably, the hydrophilic solvent is water or an aqueous solution thereof. In a preferred embodiment, γ-cyclodextrin is first dissolved in water and the selected drier is added while stirring the aqueous solution of water.

The stabilized drier of the present invention can be added to any ambient cure air-drying alkyd composition, such as found in alkyd-based resins and coatings (e.g. paints, enamels, varnishes, wood stains). Contemplated air-drying alkyd compositions can be obtained by a condensation reaction of one or more polyalcohols, one or more polycarboxylic acids or corresponding anhydrides, and long chain unsaturated fatty acids or oils (*Surface Coatings*, ed. S. Paul, John Wiley & Sons, 1996). Typical alkyd compositions include $C_{12}$-$C_{24}$ unsaturated carboxylic acids such as oleic, ricinoleic, linoleic, linolenic, and oleostearic acids thereof.

The inclusion complex of cyclodextrin and drier can be formed separately from the alkyd composition to be dried. As noted above, the inclusion complex is formed by preparing a hydrophilic solution of cyclodextrin and a metal drier. The hydrophilic solution is preferably an aqueous solution. The inclusion complex may then be added to any alkyd composition for which acceleration of drying is desired and/or required. The inclusion complex may be added as a solution or liquid suspension to the alkyd composition, or it may be isolated from the hydrophilic solution in which the complex was formed, and added as a solid to the alkyd composition.

For organic solvent-based alkyd compositions, the inclusion complex is preferably added as a solid (e.g. powder).

In yet another embodiment, there is provided a solution or a liquid suspension of the stabilized drier. Preferably, the liquid suspension is an aqueous (i.e. water-based) suspension.

For any alkyd composition containing water, such as water-in-oil emulsions or oil-in-water emulsions. (e.g. water-in-oil emulsions such as the compositions in Examples 3.1.2 and 3.1.4), the inclusion complex is preferably added as a solution or liquid suspension. The stabilized drier, as a liquid suspension or solid powder, may be added to the alkyd composition to be dried by low speed mixing (around 800 rpm) or high speed mixing (around 3500 rpm). In addition, the solid powder form of the drier was shown to be stable to the physical stress of milling (see Example 3.3). This characteristic may useful in processes for preparing solid phase compositions.

The stabilized drier is useful for maintaining the dry time stability of alkyd compositions, particularly highly pigmented alkyd compositions. Dry time issues are often seen in pigmented enamels such as the black high gloss alkyd enamel (see Example 3). Such compositions contain a high concentration of pigments that have a large surface area that will readily adsorb the drier, thus inhibiting its catalytic activity. The adsorption of driers results in increased dry time, which increases with the storage time. The results of this study indicated that the stabilized drier prevented an increase in dry time, and stabilized the dry time during storage. As noted in the dry time stability tests in Example 3, the stabilized drier was observed to protect the drier from adsorption by the pigments in the alkyd composition, thus keeping the drier available for catalysis of oxidation. Thus the present invention helps to maintain catalytic activity during storage in an alkyd composition.

Further details of the preferred embodiments of the invention are illustrated in the following Examples which are understood to be non-limiting with respect to the appended claims.

EXAMPLE 1

Cyclodextrin Synthesis and Formation of Inclusion Complexes 1.1 Cyclodextrin Synthesis Cyclodextrins can be produced from almost any starch source. Processes for preparing cyclodextrins are disclosed in Cyclodextrins and Their Complexes, ed. H. Dodziuk, Wiley-VCH Inc., 2006.

In general, to prepare cyclodextrins, starch slurry was digested with α-amylase. The α-amylase was then deactivated and a cyclodextrin glycosyl transferase, was added to catalyze the formation of cyclodextrins from the digested starch.

Toluene (2000 g) was then added to the thus-prepared product (2000 g) and mixed for around 1 hour at 100 rpm.

The product was analyzed by gel permeation chromatography (GPC) to determine the molecular weight distribution of the cyclodextrins in the mixture. The GPC chromatogram of the cyclodextrins thus prepared suggested that the molecular weight distribution of α, β and γ structures were comparable to the cyclodextrins found in commercial products such as Febreze® (Proctor & Gamble Co., U.S.A.) and Air Wick® (Reckitt Benckiser Inc., Canada) odour eliminators.

1.2 Formation of Inclusion "Host-Guest" Complex with Drier Compounds

The cyclodextrin/toluene solution prepared above in Example 1.1 was mixed with two commercially available drier compositions, (1) a cobalt-based drier, Cobalt Hex-CEM® 12% (OM Group, Inc.) and (2) a manganese-based drier, Manganese NuXtra® 9% (Creanova, Inc.). Cobalt Hex-CEM® 12% is a solution of cobalt bis(2-ethylhexanoate) in hydrotreated heavy naptha (petroleum), containing 12% cobalt metal. Manganese NuXtra® is a manganese alkanoate solution, containing 9% manganese metal.

In Examples 1.2.1 and 1.2.2 below, propylene glycol was first added to a container with stirring. While stirring, the cyclodextrin/toluene solution was slowly added. The drier composition was then slowly added to the mixture while stirring. Next, 2-butoxyethanol (Butyl Cellosolve®, Carbide and Carbon Chemicals Corp., U.S.A.) was added while stirring. Stirring was continued for a further 15 minutes.

1.2.1 Formation of Inclusion Complex of Cyclodextrin with Cobalt-based Drier

The following ingredients were mixed together according to the procedure provided above.

| Item | weight (g) | % wt/wt |
|---|---|---|
| Propylene glycol | 70.4 | 70.4 |
| Cyclodextrin-toluene complex | 9.6 | 9.6 |
| Cobalt Hex-CEM ® (12% solution) | 10 | 10 |
| Butyl Cellosolve ® | 10 | 10 |

The inclusion complex was identified as an insoluble white precipitate.

1.2.2 Formation of Cyclodextrin with Manganese-based Drier

The following ingredients were mixed together according to the procedure provided above.

| Item | weight (g) | % wt/wt |
|---|---|---|
| Propylene glycol | 70.4 | 70.4 |
| Cyclodextrin | 9.6 | 9.6 |
| Manganese NuXtra ® (9% solution) | 10 | 10 |
| Butyl Cellosolve ® | 10 | 10 |

The inclusion complex was identified as an insoluble white precipitate.

1.3 Effect of Inclusion Complexes on Dry Time Stability of an Alkyd Composition

The inclusion complex prepared in Example 1.2.1 was tested for its viability as a drier stabilizer within a Lorama® alkyd emulsion intermediate as per Example 1.3.1 below.

1.3.1 Preparation of Lorama® Alkyd Emulsion Intermediate

The Lorama® alkyd emulsion intermediate was used to test the efficacy of inclusion complex as a drier. The composition of the alkyd emulsion intermediate is as provided in Example 3.1.1.

Total alkyd solids of the emulsion intermediate is 13.97% (19.96% alkyd composition, consisting of 70% solids).

1.3.2 Thy Time Stability Tests with Cobalt

The following samples were prepared. The total metal on alkyd solid is calculated as follows:

$$\text{Total metal on alkyd solid} = \frac{(\text{weight of drier}) \times (\text{concentration of drier})}{13.97\% \text{ alkyd solids}} \times 100$$

Control Sample with Cobalt: Equivalent to 0.077% Co on Alkyd Solids.

| Item | weight (g) | % wt/wt |
|---|---|---|
| Emulsion intermediate (Example 1.3.1) | 100 | 99.91 |
| Cobalt Hex-CEM ® (12% Co metal) | 0.09 | 0.09 |

Test Sample Containing Inclusion Complex with Cobalt: Equivalent to 0.10% Co on Alkyd Solids.

| Item | weight (g) | % wt/wt |
|---|---|---|
| Emulsion intermediate (Example 1.3.1) | 100 | 98.8 |
| Inclusion complex (1.2% Co) | 1.25 | 1.2 |

The dry time of the test sample was compared against the control sample by applying a thin film of each sample and ascertaining the length of time for the film to dry completely. The dry times of the test sample and the control were ascertained at immediately after preparation of the samples, and in one week increments after, for a total of five weeks. After the initial measurement, the samples were stored at 50° C. to accelerate the loss of dry time stability. After an initial trial, all samples were allowed to equilibrate for about 24 hours before measuring dry time.

The dry time of the test sample containing the inclusion complex of cyclodextrin and cobalt drier had a significantly shorter dry time than the test sample containing cobalt drier alone. The difference in dry time was persisted over 5 weeks of storage time at 50° C. Moreover, the dry time of the test sample remained relatively constant between week 1 and week 5, as compared to the dry time of the control sample, which showed a gradual increase in dry time between week 1 and week 5. It was concluded that the addition of the inclusion complex of cyclodextrin and cobalt drier to the alkyd composition decreased dry time and improved dry time stability. Thus, an inclusion complex of cyclodextrin and a transition metal drier can be used as a stabilized drier for alkyd compositions, conferring shorter dry time (compared to an unstabilized drier) and improved dry time stability.

EXAMPLE 2

Selection of Optimal Cyclodextrin Size and Solvent for Inclusion Complex Formation The cyclodextrin mixture prepared in Example 1.1 was a mixture of α-, β- and γ-cyclodextrins. The yield of the drying reaction (i.e. autoxidation and cross-linking) and the efficacy of the inclusion complex was dependent on the total concentration of inclusion complex present. α-, β- and γ-Cyclodextrins are of different sizes and thus have different sized cavities. It was felt that the efficacy of the stabilized drier could be improved by first identifying which oligomer of cyclodextrin provided the highest yield of inclusion complex with the transition metal drier and then identifying the most suitable solvent system for preparation of the inclusion complex.

A commonly used cobalt-based drier, Cobalt Hex-CEM® 12% (OM Group, Inc.) was chosen as a representative transition metal drier.

2.1 Solvent Selection for Formation of Inclusion Complex with Cobalt-based Drier 2.1.1 Formation of Inclusion Complex with α, β and γ-cyclodextrins in non-polar Organic Solvent Toluene was chosen as a representative non-polar organic solvent in which to form the inclusion complex. 30 g each of α-cyclodextrin (CAVAMAX® W6, pharmaceutical grade, Wacker Specialties Inc.), β-cyclodextrin (CAVAMAX® W7, pharmaceutical grade, Wacker Specialties Inc.) and γ-cyclodextrin (CAVAMAX®W8, pharmaceutical grade, Wacker Specialties Inc.) were mixed into 30 g of toluene. Upon mixing, a white jelly-like translucent precipitate formed in each mixture.

30 g of Cobalt Hex-CEM® 12% was then added to each mixture, and stirred for approximately 16 hours. In all three cases, two phases were formed, a dark blue jelly-like precipitate, and a dark blue liquid phase. There was no clear evidence of formation of an inclusion complex of cyclodextrin and the cobalt drier.

2.1.2 Formation of Inclusion Complex with α-, β- and γ-cyclodextrins in water

The general procedure for preparation of the samples was as follows: α, β- or γ-cyclodextrin were dissolved into water. The amounts of cyclodextrin oligomer added were to prepare a near-saturated solution, based on the known solubility of each oligomer in water. Cobalt Hex-CEM® 12% was then added to each cyclodextrin solution and stirred.

It was expected that with hydrophobic guest molecules, the formation of inclusion complex would be indicated by the formation of a white insoluble precipitate. With hydrophilic guest compounds, the complexes that are formed are typically water soluble (*Chemistry of Polysaccharides*, ed. G. E. Zaikov, Brill Academic Publishers, 2005, p. 41).

2.1.2.1 α-Cyclodextrin

The following mixture was prepared according to the process noted above.

| Compound | Weight (g) |
|---|---|
| Water | 100 |
| CAVAMAX ® W6 (α-cyclodextrin) | 10 |
| Cobalt Hex-CEM ® 12% | 10 |

The above-noted mixture was stirred at least 20 hours at room temperature. Two phases were present in the mixture, a dark red brown cloudy phase, and a red/wine coloured transparent phase. It was clear that the formation of the desired inclusion complex did not take place. Despite rapid mixing and the extended period of time for mixing, the cobalt drier remained as a separate phase on the surface. It was concluded that an inclusion complex did not form successfully as the α-cyclodextrin cavity may be too small to accommodate the cobalt salt.

2.1.2.2 β-Cyclodextrin

The following mixture was prepared according to the process noted above.

| Compound | Weight (g) |
|---|---|
| Water | 100 |
| CAVAMAX ® W6 (β-cyclodextrin) | 1.5 |
| Cobalt Hex-CEM ® 12% | 1.5 |

The above-noted mixture was stirred at least 20 hours at room temperature. Two phases were present in the mixture, a small amount of white precipitate and a reddish-orange coloured transparent phase. However, most of the cobalt drier remained at the surface of the mixture.

The white precipitate was isolated. The reddish-orange aqueous phase and the white precipitate were analyzed by FTIR and compared against the FTIR spectrum of each of β-cyclodextrin and Cobalt Hex-CEM® alone (see FIG. 1(*a*)). It was concluded that the white precipitate was the desired inclusion complex. However, based on the low yield of inclusion complex, it was thought that the β-cyclodextrin cavity may not be large enough to accommodate the cobalt salt.

2.1.2.3 γ-Cyclodextrin

The following mixture was prepared according to the process noted above.

| Compound | Weight (g) |
|---|---|
| Water | 100 |
| γ-Cyclodextrin (Cyclolab Inc., Hungary) | 23 |
| Cobalt Hex-CEM ® 12% | 23 |

The γ-cyclodextrin dissolved very quickly at room temperature in the water, within about 5 minutes. Upon addition of the cobalt drier, a light purple precipitate formed. The mixture was stirred for at least 16 hours at ambient temperature. The pH of the mixture was observed to be pH 6.80. After at least 16 hours of stirring, the precipitate was filtered off. The filtrate (aqueous phase) as clear and colourless. The weight of recovered aqueous phase from filtration was approximately 100 g, suggesting a yield of close to 100% for the formation of the inclusion complex. The isolated precipitate was dried under reduced pressure, around 19 InHg, at around 50° C. The dried precipitate was analyzed by FTIR and the resultant spectrum compared against the FTIR spectrum of each of γ-cyclodextrin and Cobalt Hex-CEM® alone (see FIG. 1(b)).

γ-Cyclodextrin has greater solubility in water than either α-cyclodextrin or β-cyclodextrin (solubility in 100 mL water, at room temperature: α-cyclodextrin: 14.5 g; β-cyclodextrin: 1.85 g; γ-cyclodextrin: 23.2 g; see Chem. Rev. 1998, 98, 1743-1752). γ-Cyclodextrin also has a larger hydrophobic cavity than either α-cyclodextrin or β-cyclodextrin (see Scheme 2(b) above) and thus, it readily forms an inclusion complex with the cobalt salt. From this test, it was concluded that γ-cyclodextrin dissolved water provided the highest yield of inclusion complex with a transition metal-based drier.

2.2 Preparation of γ-cyclodextrin Inclusion Complexes of Other Common Metal Driers The γ-cyclodextrin aqueous solution was tested for its ability to form inclusion complexes with other common commercially available metal driers besides a cobalt-based drier (Cobalt Hex-CEM® 12%, as noted above). For each sample, γ-cyclodextrin (the host molecule) was first dissolved in water, and a metal drier (the guest molecule) was then added to the cyclodextrin solution, according to the following method.

For each sample noted below, 23 g of industrial grade γ-cyclodextrin (Cyclolab Inc., Hungary) was added to 100 g of deionized water and mixed at room temperature.

For each of the samples prepared below, the inclusion complex thus formed was analyzed by FTIR and compared against the FTIR spectrum of γ-cyclodextrin and of the drier alone. FTIR spectra for the above samples are provided in FIG. 1 (c) through (i).

2.2.1 γ-Cyclodextrin+Calcium Drier 23 g of a calcium-based drier, Calcium CEM-ALL® 10% solution (OM Group, Inc.) was added to the above-noted γ-cylodextrin solution. A white precipitate formed upon addition of the drier. The mixture was stirred for at least 16 hours. The precipitate was filtered off under reduced pressure. The precipitate was dried under normal conditions at ambient temperature. The FTIR spectrum of the resultant inclusion complex is provided in FIG. 1(c).

2.2.2 γ-Cyclodextrin+Manganese Drier 23 g of a manganese-based drier, Manganese CEM-ALL® 12% solution (OM Group, Inc.) was added to the above-noted γ-cylodextrin solution. A brown precipitate formed upon addition of the drier. The mixture was stirred for at least 16 hours. The precipitate was filtered off under reduced pressure. The filtrate was light yellow coloured. The precipitate was dried under reduced pressure (around 19 InHg) at 50-60° C. The FTIR spectrum of the resultant inclusion complex is provided in FIG. 1(d).

2.2.3 γ-Cyclodextrin+Zirconium Drier 23 g of a zirconium-based drier, Zirconium Hex-CEM® 12% solution (OM Group, Inc.) was added to the above-noted γ-cylodextrin solution. A white precipitate formed upon addition of the drier. The mixture was stirred for at least 16 hours. The precipitate was filtered off under reduced pressure. The precipitate was dried under normal conditions at ambient temperature. The FTIR spectrum of the resultant inclusion complex is provided in FIG. 1(e).

2.2.4 γ-Cyclodextrin+Iron Drier 23 g of a iron organic salt, iron octoate 11% solution (OM Group, Inc.) was added to the above-noted γ-cylodextrin solution. A dark reddish brown precipitate formed upon addition of the drier. The mixture was stirred for at least 16 hours. The precipitate was filtered off under reduced pressure. The precipitate was dried under reduced pressure (around 19 InHg) at 50-60° C. The FTIR spectrum of the resultant inclusion complex is provided in FIG. 1(f).

2.2.5 γ-Cyclodextrin+Cerium Drier 23 g of a cerium-based drier, Cerium Hex-CEM® 12% solution (OM Group, Inc.) was added to the above-noted γ-cyclodextrin solution. A white precipitate formed upon addition of the drier. The mixture was stirred for at least 16 hours. The precipitate was filtered off under reduced pressure. The precipitate was dried under normal conditions at ambient temperature. The FTIR spectrum of the resultant inclusion complex is provided in FIG. 1(g).

2.2.6 γ-Cyclodextrin+Rare Earth Drier 23 g of Rare Earth Hex-CEM® 12% solution (OM Group, Inc.) was added to the above-noted γ-cyclodextrin solution. An oily white precipitate formed upon addition of the drier. The mixture was stirred for at least 16 hours. The precipitate was filtered off under reduced pressure. The precipitate was dried under normal conditions at ambient temperature. The FTIR spectrum of the resultant inclusion complex is provided in FIG. 1(h).

2.2.7 γ-Cyclodextrin+Zinc Drier 23 g of a zinc-based drier, Zinc Hex-CEM® 18% solution (OM Group, Inc.) was added to the above-noted γ-cyclodextrin solution. A white precipitate formed upon addition of the drier. The mixture was stirred for at least 16 hours. The precipitate was filtered off under reduced pressure. The precipitate was dried under normal conditions at ambient temperature. The FTIR spectrum of the resultant inclusion complex is provided in FIG. 1(i).

EXAMPLE 3

Determination of Dry Time Stability

The inclusion complexes of cyclodextrin and transition metal drier (referred to as "stabilized drier") were tested for their applicability with various alkyd compositions.

The stabilized driers containing cobalt, manganese, iron and cerium, were tested in two different forms, as aqueous suspensions and as dry powders (as prepared in Example 2). The water based suspensions were prepared by addition of 23 g of γ-cyclodextrin to 100 g of deionized water, and 23 g of metal drier.

3.1 Alkyd Compositions for Use in Dry Time Stability Tests

For the dry time stability tests of Example 3.2, a series of three samples were prepared for each of the compositions prepared in Example 3.1.

1. Control: no primary drier added;
2. Standard: commercially available primary drier added;
3. (a) With stabilized drier in powder form; and/or (b) with stabilized drier in aqueous solution/suspension form.

For each alkyd composition, the standard sample was prepared with unstabilized primary drier, and another sample was prepared with stabilized primary drier (stabilized Cobalt Hex-CEM®; see Example 2). The composition of the control sample was the same as the standard, except what the primary drier was excluded. Compositions noted in Examples 3.1.2 to 3.1.7 contained calcium and zirconium-based auxiliary driers (NuXtra® Ca 10%, Creanova Inc.; Calcium CEM-ALL® 10%, OM Group Inc.; Zirconium Hex-Cem® 18%, OM Group Inc.).

3.1.1 Lorama® Alkyd Emulsion Intermediate

The Lorama® alkyd emulsion intermediate does not contain any pigments. It is an intermediate for allowing addition of Lorama® LPR76™ resin to organic solvent based compositions.

The composition of the Lorama® alkyd emulsion intermediate is provided in the table below. For Example 3.2.1 (below), standard samples of the alkyd emulsion intermediate were prepared by addition of each of Cobalt Hex-CEM® 12% (OM Group, Inc), Manganese CEM-ALL® 12% (OM Group, Inc.) and iron octoate 11% (OM Group, Inc.), and Cerium Hex-CEM® 12% (OM Group, Inc.). Corresponding samples were prepared by addition of the corresponding stabilized drier, i.e. the drier in inclusion complex form (as prepared in Example 2).

| Ingredient | Standard % wt/wt | With Stabilized Drier in Solid Form Added % wt/wt | With Stabilized Drier in Liquid Form Added % wt/wt |
|---|---|---|---|
| Duramac LOA ® 50-5070 70% (Eastman Chemical Co.) | 19.96 | 19.96 | 19.96 |
| Regular mineral spirits | 14.38 | 14.38 | 14.38 |
| LAF120 ® defoamer (25% Active) (Lorama Inc.) | 0.50 | 0.5 | 0.50 |
| Lorama ® LPR76 ™ Resin | 6.98 | 6.98 | 6.98 |
| Water | 58.18 | 58.18 | 58.18 |
| TOTAL | 100.00 | 100.00 | 100.00 |
| (1) Post Addition of Cobalt Drier to Alkyd Emulsion Intermediate (0.1% w/w Co on alkyd solid): | | | |
| Cobalt Hex-CEM 12% (OM Group Inc.) | 0.12 | 0.00 | 0.00 |
| Stabilized cobalt drier, powder form, 6% | 0.00 | 0.23 | 0.00 |
| Stabilized cobalt drier, liquid form, 1.89% | 0.00 | 0.00 | 0.74 |
| (2) Post Addition of Manganese Drier to Alkyd Emulsion Intermediate (0.1% w/w Mn on alkyd solid): | | | |
| Manganese CEM-ALL 12% (OM Group, Inc.) | 0.12 | 0.00 | 0.00 |
| Stabilized manganese drier, powder form, 5.58% | 0.00 | 0.25 | 0.00 |
| (3) Post Addition of Iron Drier to Alkyd Emulsion Intermediate (0.2% w/w Fe on alkyd solid): | | | |
| Iron octoate, 11% (OM Group, Inc.) | 0.26 | 0.00 | 0.00 |
| Stabilized iron drier, powder, 5.5% | 0.00 | 0.51 | 0.00 |
| (4) Post Addition of Cerium Drier to Alkyd Emulsion Intermediate (0.3% w/w Ce on alkyd solid): | | | |
| Cerium Hex-CEM, 12% | 0.35 | 0.00 | 0.00 |
| Stabilized cerium drier, powder, 6% | 0.00 | 0.70 | 0.00 |

3.1.2 Lorama® Polysaccharide Resin ("LPRT™") Modified Premium High Gloss White Alkyd Enamel This enamel is an organic solvent based enamel which has been modified with the Lorama® alkyd emulsion intermediate as prepared in Example 3.1.1.

| Ingredient | Standard % wt | With Stabilized Drier in Solid Form Added % wt |
|---|---|---|
| Duramac LOA ® 50-5070 70% (Eastman Chemical Co.) | 12.09 | 12.09 |
| Regular mineral spirits | 1.05 | 1.05 |
| Bentone SD-1 ® (Elementis Specialities Inc.) | 0.11 | 0.11 |
| Mix well, then add: | | |
| Calcium CEM-ALL ® 10% (OM Group, Inc) | 0.64 | 0.64 |
| Lorama ® LDA ™ 100 dispersant (Lorama Inc.) | 0.36 | 0.36 |

| Ingredient | Standard % wt | With Stabilized Drier in Solid Form Added % wt |
|---|---|---|
| Titanium Dioxide R706 ® (Dupont, Inc.) | 23.71 | 23.71 |
| Adjust grind viscosity with: | | |
| Regular mineral spirits | 1.05 | 1.05 |
| Sand mill to Hegman 7+ | | |
| Add the following blend to stabilize the grind | | |
| Duramac LOA ® 50-5070 70% (Eastman Chemical Co.) | 5.27 | 5.27 |
| Regular mineral spirits | 2.10 | 2.10 |
| Add under agitation: | | |
| Duramac LOA ® 50-5070 70% (Eastman Chemical Co.) | 23.93 | 23.93 |
| Aromatic 150 ® (ExxonMobil Chemical Co.) | 1.58 | 1.58 |
| Regular mineral spirits | 3.59 | 3.59 |
| Zirconium Hex-Cem ® 18% (OM Group, Inc.) | 0.53 | 0.53 |
| Skino ® #2 Anti Skin (OM Group, Inc.) | 0.32 | 0.32 |
| Add next with agitation: | | |
| Alkyd emulsion intermediate from Example 3.1.1 | 22.63 | 22.63 |
| Agitate for 30 minutes when agitation is low (100 rpm) | | |
| Adjust viscosity with: | | |
| Regular mineral spirits | 1.01 | 1.01 |
| TOTAL | 100.00 | 100.00 |
| Post Addition: (0.1% Co on alkyd solid) | | |
| Cobalt Hex-CEM 12% (OM Group Inc.) | 0.27 | 0.00 |
| Stabilized cobalt drier, powder form, 6% | 0.00 | 0.53 |

3.1.3 Black High Gloss Alkyd Enamel

| Ingredient | Standard % wt | With Stabilized Drier in Solid Form Added % wt |
|---|---|---|
| Duramac LOA ® 50-5070 70% (Eastman Chemical Co.) | 25.94 | 25.94 |
| Regular mineral spirits | 6.47 | 6.47 |
| Bentone SD-1 ® (Elementis Specialities Inc.) | 1.29 | 1.29 |
| Disperse at high speed for 10 min. then add: | | |
| Calcium CEM-ALL ® 10% (OM Group, Inc.) | 1.23 | 1.23 |
| Lorama ® LDA 100 ™ dispersant (Lorama Inc.) | 0.32 | 0.32 |
| Mix for 5 min. then add | | |
| Printex ® 45 (Evonik Degussa Inc.) | 1.95 | 1.95 |
| Mix for 20 min.; wet for 24 h. Adjust viscosity with: | | |
| Regular mineral spirits | 1.29 | 1.29 |
| Sand mill to Hegman 7.5+ | | |
| Wash Mill with: | | |
| Duramac LOA ® 50-5070 70% (Eastman Chemical Co.) | 10.37 | 10.37 |
| Regular mineral spirits | 1.95 | 1.95 |
| Transfer to tank. | | |
| Add under agitation: | | |
| Duramac LOA ® 50-5070 70% (Eastman Chemical Co.) | 35.02 | 35.02 |
| Regular mineral spirits | 12.79 | 12.79 |
| Zirconium Hex-Cem ® 18% (OM Group, Inc.) | 1.10 | 1.10 |
| Calcium CEM-ALL ® 10% (OM Group, Inc.) | 1.25 | 1.25 |
| Skino ® #2 Anti Skin (OM Group, Inc.) | 0.23 | 0.23 |
| TOTAL | 100.00 | 100.00 |
| Post Addition: (0.1% Co on alkyd solid) | | |
| Cobalt Hex-CEM 12% (OM Group Inc.) | 0.42 | 0.00 |
| Stabilized cobalt drier, powder form, 6% | 0.00 | 0.83 |

3.1.4 LPRT™ Modified Black High Gloss Alkyd Enamel

| Ingredient | Standard % wt | With Stabilized Drier in Solid Form Added % wt | With Stabilized Drier in Liquid Form Added % wt |
|---|---|---|---|
| Duramac LOA ® 50-5070 70% (Eastman Chemical Co.) | 21.56 | 21.56 | 21.56 |
| Regular mineral spirits | 2.29 | 2.29 | 2.29 |

-continued

| Ingredient | Standard % wt | With Stabilized Drier in Solid Form Added % wt | With Stabilized Drier in Liquid Form Added % wt |
|---|---|---|---|
| Bentone SD-1 ® (Elementis Specialities Inc.) Mix well then add: | 0.13 | 0.13 | 0.13 |
| Lorama ® LDA 100 ™ dispersant (Lorama Inc.) | 0.32 | 0.32 | 0.32 |
| NuXtra ® Ca 10% (Creanova Canada Inc.) | 0.80 | 0.80 | 0.80 |
| Printex ® 60 (Evonic Degussa Inc.) Adjust viscosity of the grind with: | 1.90 | 1.90 | 1.90 |
| Duramac LOA ® 50-5070 70% (Eastman Chemical Co.) | 7.61 | 7.61 | 7.61 |
| Regular mineral spirits Sandmill to Hegman 7+ N.S. then wash mill with: | 2.60 | 2.60 | 2.60 |
| Duramac LOA ® 50-5070 70% (Eastman Chemical Co.) | 7.61 | 7.61 | 7.61 |
| Regular mineral spirits Transfer and under agitation: | 1.90 | 1.90 | 1.90 |
| Duramac LOA ® 50-5070 70% (Eastman Chemical Co.) | 10.14 | 10.14 | 10.14 |
| Regular Mineral Spirits | 9.51 | 9.51 | 9.51 |
| Zirconium Hex-Cem ® 12% (OM Group, Inc.) | 0.71 | 0.71 | 0.71 |
| Skino ® #2 Anti Skin (OM Group, Inc.) Blend well and add under agitation: | 0.16 | 0.16 | 0.16 |
| Lorama ® LPR76 ™ resin (Lorama Inc.) Add the following with agitation to vortex: | 5.07 | 5.07 | 5.07 |
| Water Mix 30 min. before test. | 25.37 | 25.37 | 25.37 |
| Regular mineral spirits | 2.32 | 2.32 | 2.32 |
| TOTAL Post Addition: (0.1% Co on alkyd solid) | 100.00 | 100.00 | 100.00 |
| Cobalt Hex-CEM 12% (OM Group Inc.) | 0.27 | 0.00 | 0.00 |
| Stabilized cobalt drier, powder form, 6% | 0.00 | 0.55 | 0.00 |
| Stabilized cobalt drier, liquid form, 1.89% | 0.00 | 0.00 | 1.74 |

3.1.5 High Solids White Alkyd Enamel

| Ingredient | Standard % wt | With Stabilized Drier in Solid Form Added % wt |
|---|---|---|
| Worleekyd ® B6301 90% LOA (Worlee Inc.) | 11.78 | 11.78 |
| Bentone SD-1 ® (Elementis Specialities Inc.) | 0.39 | 0.39 |
| Lorama ® LDA150 Dispersant (Lorama Inc.) Mix until uniform then: | 0.59 | 0.59 |
| Ti-Pure ® R706 titanium dioxide (E. I. du Pont de Nemours and Co.) | 29.45 | 29.45 |
| Worleekyd ® B6301 90% LOA (Worlee Inc.) | 4.39 | 4.39 |
| Regular mineral spirits Add to grind paste: | 4.91 | 4.91 |
| Worleekyd ® B6301 90% LOA (Worlee Inc.) | 40.05 | 40.05 |
| Aromatic ® 100 (ExxonMobil Chemical Co.) | 1.96 | 1.96 |
| Regular mineral spirits | 4.29 | 4.29 |
| Zirconium Hex-Cem ® 12% (OM Group, Inc.) | 0.83 | 0.83 |
| Calcium CEM-ALL ® 10% (OM Group, Inc) | 0.50 | 0.50 |
| Skino ®#2 Anti Skin (OM Group, Inc.) | 0.50 | 0.50 |
| BRAZIL ® 2% Baysilone ® A Solution (ICI Inc.) Adjust viscosity with: | 0.10 | 0.10 |
| Regular mineral spirits | 0.26 | 0.26 |
| TOTAL Post Addition: (0.1% Co on alkyd solid) | 100.00 | 100.00 |
| Cobalt Hex-CEM 12% (OM Group Inc.) | 0.42 | 0.00 |
| Stabilized cobalt drier, powder 6% | 0.00 | 0.84 |

3.1.6 High Solids Black Alkyd Enamel

| Ingredient | Standard | With Stabilized Drier in Solid Form Added % wt |
|---|---|---|
| Worleekyd ® B6301 90% LOA (Worlee Inc.) | 8.09 | 8.09 |
| Regular mineral spirits | 3.20 | 3.20 |
| Disperbyk ® 115 (BYK-CHEMIE GmbH) | 1.42 | 1.42 |
| Mix thoroughly then add slowly: | | |
| Printex ® U (Evonik Degussa Inc.) | 2.83 | 2.83 |
| Mix at low speed for 1 hour, then sand mill to Hegman 8+ | | |
| Complete with: | | |
| Worleekyd ® B6301 90% LOA (Worlee Inc.) | 2.63 | 2.63 |
| Regular mineral spirits | 2.02 | 2.02 |
| Skino ®#2 Anti Skin (OM Group, Inc.) | 0.04 | 0.04 |
| Add to grind paste: | | |
| Worleekyd ® B6301 90% LOA (Worlee Inc.) | 11.63 | 11.63 |
| Mix well then complete as follows: | | |
| Worleekyd ® B6301 90% LOA (Worlee Inc.) | 58.12 | 58.12 |
| Regular mineral spirits | 4.76 | 4.76 |
| Aromatic ® 150 (ExxonMobil Chemical Co.) | 2.53 | 2.53 |
| Zirconium Hex-Cem ® 12% (OM Group, Inc.) | 1.19 | 1.19 |
| Calcium CEM-ALL ® 10% (OM Group, Inc) | 1.07 | 1.07 |
| Skino ®#2 Anti Skin (OM Group, Inc.) | 0.36 | 0.36 |
| Adjust viscosity with: | | |
| Regular mineral spirits | 0.20 | 0.20 |
| TOTAL | 100.00 | 100.00 |
| Post Addition: (0.1% Co on alkyd solid) | | |
| Cobalt Hex-CEM 12% (OM Group Inc.) | 0.60 | 0.00 |
| Stabilized cobalt drier, powder 6% | 0.00 | 1.21 |

3.1.7 Water-Based Alkyd Emulsion Enamel

| Ingredient | Standard | With Stabilized Drier in Liquid Form Added % wt |
|---|---|---|
| Prepare Mill Base: | | |
| water | 6.96 | 6.46 |
| EFKA ® 4550 dispersing agent (EFKA Inc.) | 2.49 | 2.49 |
| Byk ®-024 (BYK CHEMIE GmbH) | 0.05 | 0.05 |
| Kronos 2160 Titanium D (Kronos Inc.) | 24.87 | 24.87 |
| Pre-wet mill base and adjust vortex with next | | |
| Acrysol ® RM-825 (Rohm and Haas Co.) | 0.10 | 0.10 |
| Disperse at high speed to Heg = 7+ | | |
| Stabilize Grind with next pre-mix at low speed | | |
| water | 0.99 | 0.99 |
| Propylene glycol (Dow Chemical Co.) | 1.49 | 0.49 |
| Prepare letdown: | | |
| Alkyd Emulsion SI Group XE15848 (SI Group, Inc.) | 57.62 | 57.62 |
| Pre-mix next ingredients and add to resin under agitation: | | |
| water | 1.45 | 0.40 |
| BYK ®348 Additive (BYK-CHEMIE GmbH) | 0.20 | 0.20 |
| Calcium Hydro-Cem ® 5% (OM Group, Inc.) | 1.41 | 1.41 |
| Zirconium Hydro-CEM ® 12% (OM Group, Inc.) | 0.88 | 0.88 |
| Cobalt Hex-CEM 12% (OM Group Inc.) | 0.30 | 0.00 |
| Stabilized cobalt drier, liquid 1.89% | 0.00 | 1.86 |
| Mix all letdown well for 5 minutes then add stabilized mill base under agitation at slow speed. | | |
| Mix well then complete with by adding next: | | |
| Byk ®-024 (BYK-CHEMIE GmbH) | 0.05 | 0.05 |
| Adjust viscosity with: | | |
| Acrysol ® RM-825 (Rohm and Haas Co.) | 0.45 | 0.45 |
| Acrysol ® RM-2020NPR (Rohm and Haas Co.) | 0.70 | 0.70 |
| TOTAL | 100.00 | 100.00 |

3.2 Dry Time Stability Tests

The initial dry time of each control, standard and sample was measured using a BYK-Gardner® drying time recorder (BYK-Gardner GmbH). The samples were then stored in an oven at 50° C. and the dry time was measured weekly. The dry times for each composition were recorded and summarized in graphs as provided in FIG. 2. In all cases, the initial dry time of the control samples (which lacked any primary drier such as a cobalt drier) exceeded 24 hours. As such, the initial dry times of the controls are not included in the graphs.

3.2.1 Comparison of Dry Time Stability for Different Transition Metals

γ-Cyclodextrin inclusion complexes of different metal driers were tested for their ability to provide dry time stability in alkyd compositions. The emulsion intermediate alkyd composition (as per Example 3.1.1) was used as the test alkyd composition. In each case, the dry time of one or more samples of emulsion intermediate containing a stabilized drier (i.e. as an inclusion complex with γ-cyclodextrin) were compared against a standard sample of the emulsion intermediate and the drier alone.

The stabilized drier complexes noted below were prepared as noted in Example 2.

Drier dose was calculated as weight percent of actual transition metal on alkyd solids (see Example 1.3.2).

The standard sample and the sample containing the stabilized drier (either powder or liquid form) thus contained the same amount of the metal being tested.

TABLE 1

| Drier Dosage | | | | |
|---|---|---|---|---|
| Drier Type | Cobalt | Manganese | Iron | Cerium |
| % wt/wt | 0.1 | 0.1 | 0.2 | 0.3 |

In some cases, two sets of samples were prepared. In the first set, the stabilized drier was added to the alkyd composition while mixing at low speed (around 800 rpm). In the second set, the stabilized drier was added to the alkyd composition while mixing at high speed (around 3500 rpm).

3.2.1.1 Stabilized Cobalt Drier

Figure 2A:
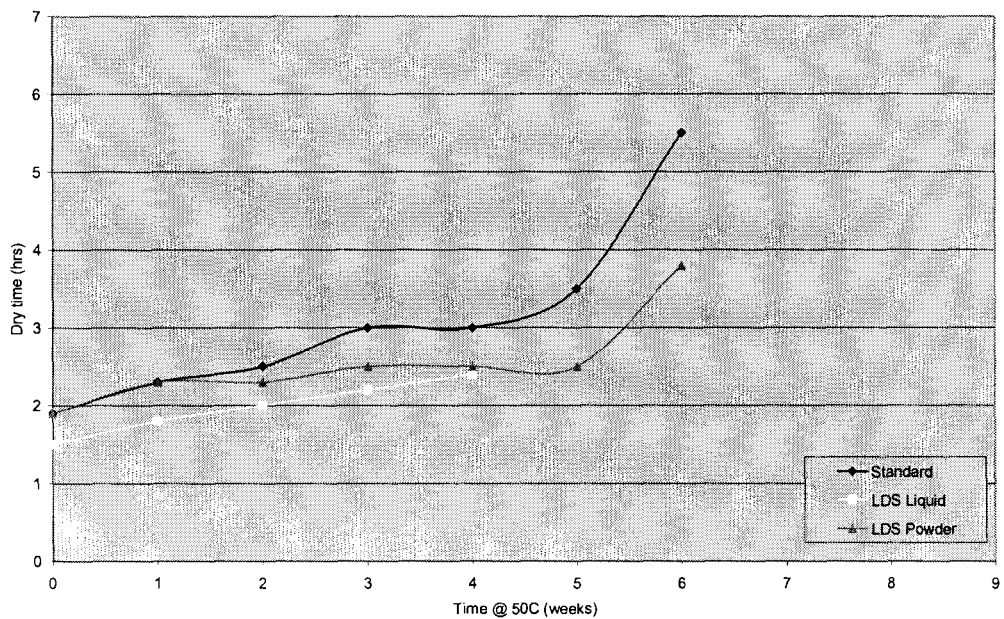
FIG. 2(a) illustrates a comparison of the dry time stabilities of Lorama® alkyd emulsion intermediate with stabilized cobalt drier added in either liquid form ("LDS liquid") and powder form ("LDS Powder"), and the dry time stability of a standard composed of Lorama® alkyd emulsion intermediate with cobalt drier alone (unstabilized) ("Standard")

The initial dry time of the standard and the sample with powder stabilized drier (added with low speed mixing) were similar (see FIG. 2(a)). By the second week, the samples containing the stabilized drier (added as either powder or liquid suspension) had a noticeably shorter dry time compared to the standard. After six weeks of storage, the sample with powder stabilized drier added dried nearly two hours before the standard. Thus, the powder form of the stabilized drier appeared to provide more effective dry time stability.

3.2.1.2 Stabilized Manganese Drier

Figure 2B:
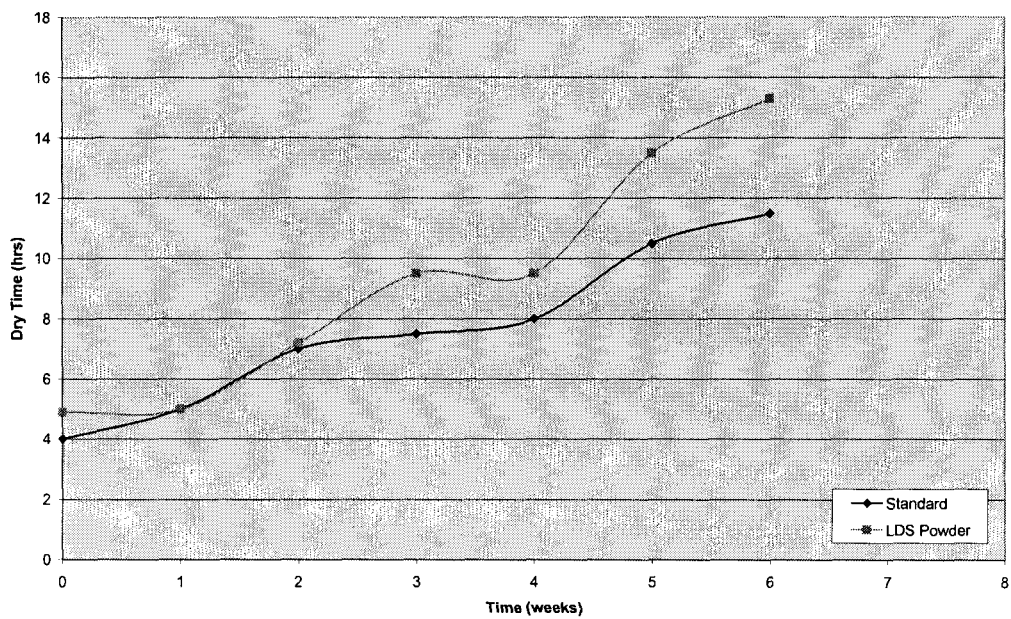
FIG. 2(b) illustrates a comparison of the dry time stability of Lorama® alkyd emulsion intermediate with stabilized manganese drier added ("LDS powder"), and the dry time stability of the Lorama® alkyd emulsion intermediate with manganese drier alone (unstabilized) ("Standard")

A sample containing powdered stabilized manganese drier (added with low speed mixing) was compared with a standard sample of emulsion intermediate with manganese drier (FIG. 2(b)). The sample with stabilized manganese drier began to exhibit a greater dry time than the standard after three weeks of storage. As previously observed during the preparation of the stabilized manganese drier (see Example 2.2.2), this was likely due to oxidation of the manganese during formation of the inclusion complex.

3.2.1.3 Stabilized Iron Drier

Figure 2C:
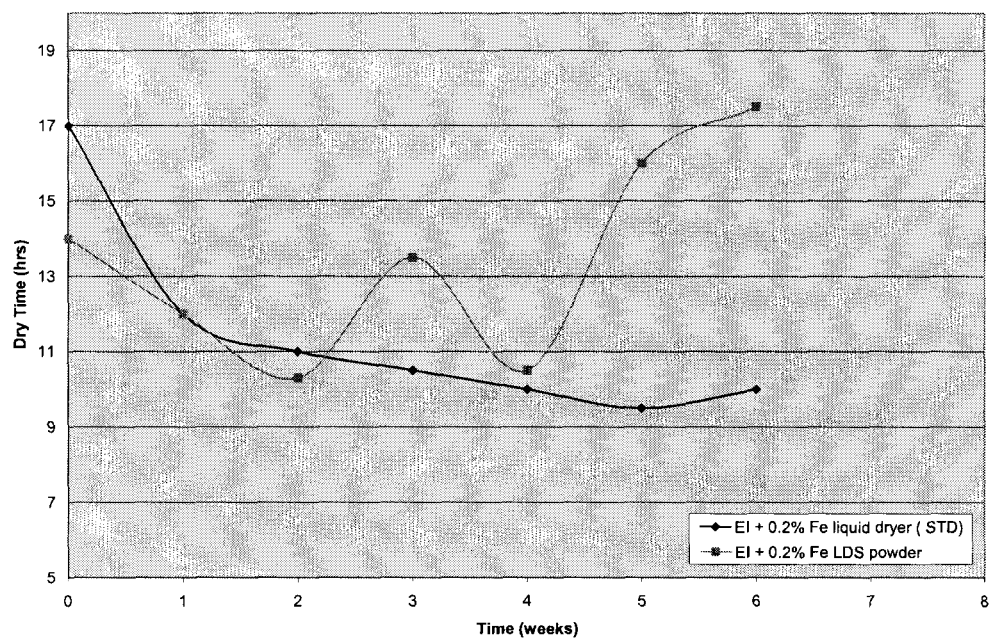
FIG. 2(c) illustrates a comparison of the dry time stability of Lorama® alkyd emulsion intermediate with stabilized iron drier added ("EI+0.2% Fe LDS powder"), and the dry time stability of the Lorama® alkyd emulsion intermediate with iron drier alone (unstabilized) ("EI+0.2% Fe liquid dryer (STD)")

A sample containing powdered stabilized iron drier (added with low speed mixing) was compared with a standard sample of emulsion intermediate with iron drier (FIG. 2(c)). The initial dry time of the sample with powder stabilized iron drier added was three hours less than the standard, but began to increase with increasing storage time following preparation. The sample with stabilized iron drier began to exhibit a greater dry time than the standard after five weeks of storage. As previously observed during the preparation of the stabilized iron drier (see Example 2.2.4), this was likely due to oxidation of iron during formation of the inclusion complex.

3.2.1.4 Stabilized Cerium Drier

Figure 2D:
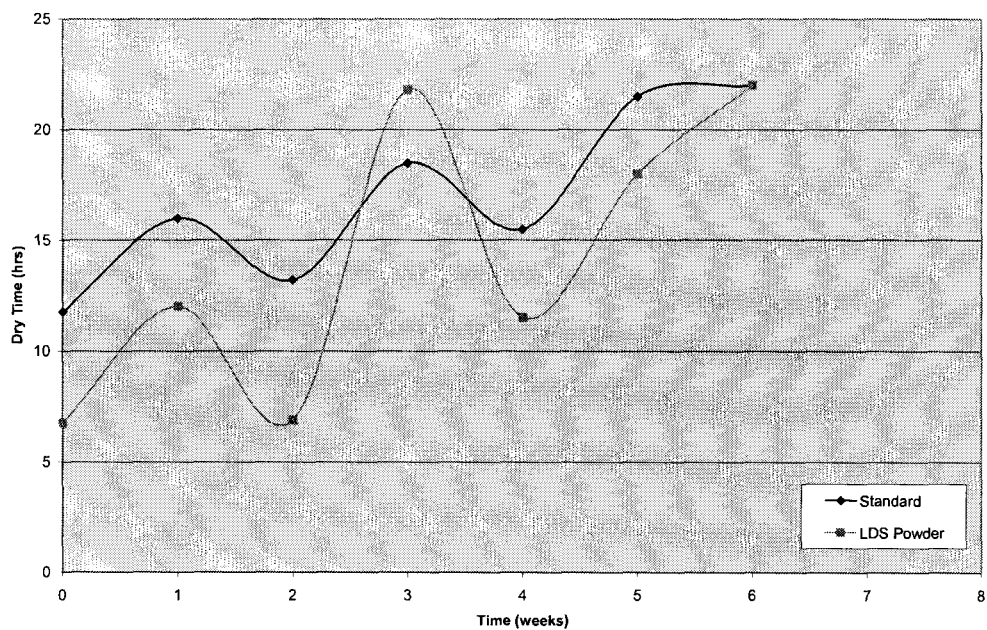
FIG. 2(d) illustrates a comparison of the dry time stability of Lorama® alkyd emulsion intermediate with stabilized cerium drier added ("LDS powder"), and the dry time stability of the Lorama® alkyd emulsion intermediate with cerium drier alone (unstabilized) ("Standard")

A sample containing the powdered form of stabilized cerium drier (added with low speed mixing) was compared with a standard sample of emulsion intermediate with cerium drier (FIG. 2(d)). The initial dry time of the sample containing the stabilized cerium drier was about five hours less than the standard. After five weeks of storage, the dry times for both samples increased. However, the sample containing the stabilized cerium drier remained an average of about 3.5 hours less than the standard.

3.3 Stability of Inclusion Complex to Different Methods of Addition to Alkyd Composition Using the LPRT™ premium high gloss white alkyd enamel prepared in Example 3.1.2, samples were prepared in which the method of addition to the alkyd enamel and the form of the drier was varied. The concentration of cobalt drier in each sample was as noted in Table 1, i.e. 0.1% wt/wt.

Figure 3A:
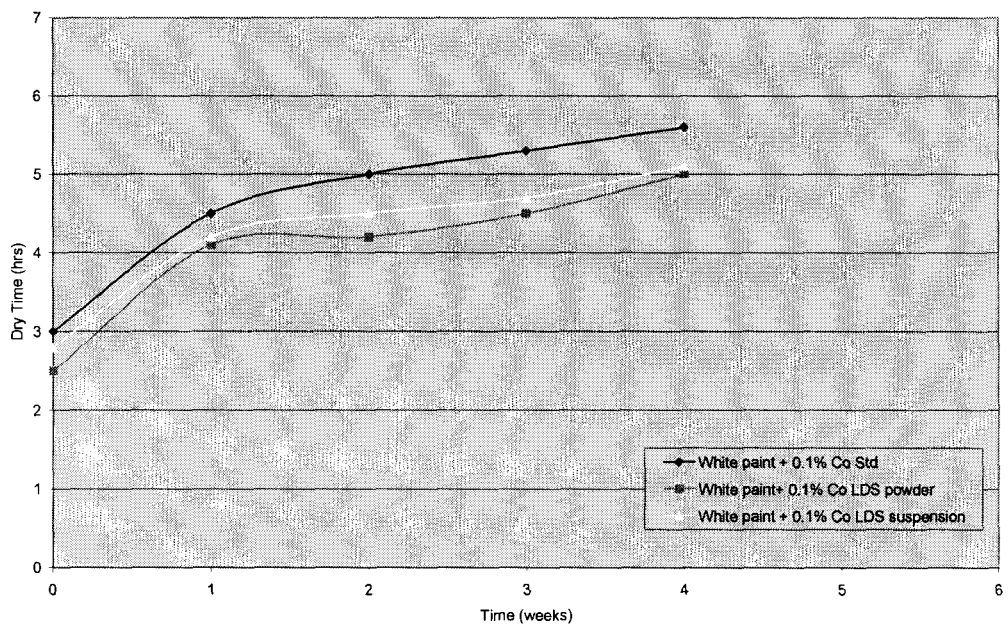
FIG. 3 illustrates a comparison of the dry time stability of a premium high gloss white alkyd enamel modified with Lorama® polysaccharide resin ("LPRT™"; denoted here as "White paint") (composition as per Example 3.1.2) with stabilized cobalt drier added and the dry time stability of the same alkyd enamel with cobalt drier alone (in FIG. 3(a), "White paint+0.1% Co std"; in Figure (b), "Standard"
in FIG. 3(c), "Co dryer (std)"), wherein:
(a) a liquid suspension stabilized cobalt drier was added with low speed mixing to a sample of the enamel ("White paint+0.1% Co LDS suspension"), and a solid powder of stabilized cobalt drier was added with low speed mixing to a sample of the alkyd enamel ("White paint+0.1% Co LDS power");
(b) a solid powder of the stabilized cobalt drier was added with high speed mixing to a sample of the alkyd enamel ("LDS Powder"); and
(c) a solid powder of the stabilized cobalt drier was added to the alkyd enamel in a sand mill ("Co LDS Powder")

Samples of alkyd enamel were prepared in which (i) a liquid suspension of stabilized cobalt drier and (ii) a solid powder of stabilized cobalt drier were added with low speed mixing (around 800 rpm) to alkyd enamel. The dry time stability of these two samples was observed and compared against the dry time stability of a standard of alkyd enamel with cobalt drier alone (see FIG. 3(a)). After four weeks of storage, the sample with powder stabilized drier added and the sample with liquid suspension of stabilized drier added both exhibited a dry time of about 45 minutes less than the dry time of the standard.

Figure 3B:
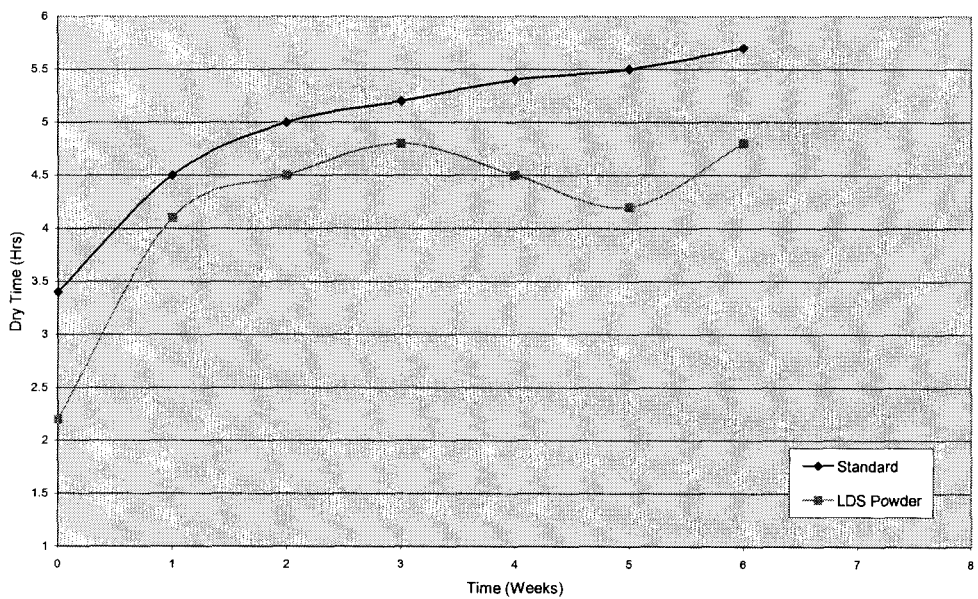
Figure 3C:
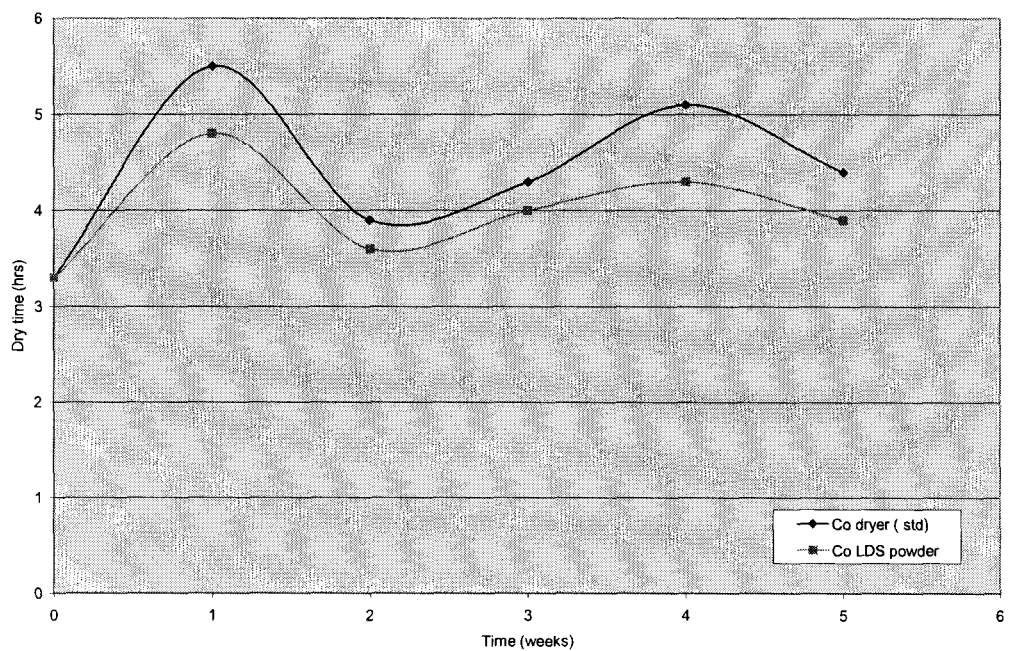

A sample of alkyd enamel with a solid powder of stabilized cobalt drier was prepared, wherein the stabilized cobalt drier was added with high speed mixing (around 3500 rpm) to alkyd enamel. The dry time stability of this sample was observed and compared against the standard as described above (see FIG. 3(b)). After six weeks of storage, the sample with powder stabilized drier added had a dry time of about one hour less than the standard.

In order to determine whether the stabilized drier could withstand physical stress without loss of activity, a sample of alkyd enamel with a solid powder of stabilized drier was prepared wherein the stabilized cobalt drier was added to the alkyd enamel and mixed using a sand mill. The dry time stability of the resultant sample was compared against the standard. After five weeks of storage, the sample with stabilized drier exhibited a dry time of about 45 minutes less than the dry time of the standard.

3.4 Comparison of Dry Time Stability of Various Alkyd Compositions Comprising a Stabilized Cobalt Drier In the following series of tests, the dry time of an alkyd composition with stabilized cobalt drier (prepared in Example 2.1.2.3) added was compared against a standard sample of the same alkyd composition containing the cobalt drier Cobalt Hex-CEM® 12% in free form (i.e. unstabilized). The alkyd compositions tested are as provided in Example 3.1. Samples were stored at 50° C. following preparation and for the duration of the dry time stability tests. The dry time of each sample was measured at one week intervals following their preparation.

3.4.1 Lorama® Alkyd Emulsion Intermediate

Figure 4A:
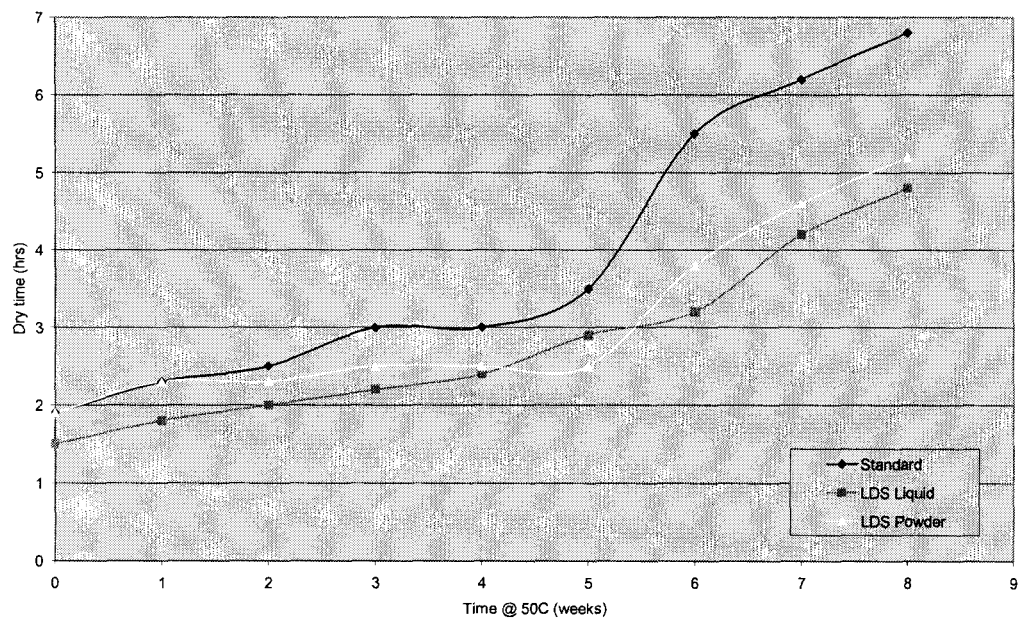
FIG. 4 illustrates a comparison of the dry time stability of a given alkyd composition with stabilized cobalt drier added and the dry time stability of the same alkyd composition with the cobalt drier alone added (collectively, the "Standard"), wherein the following different alkyd compositions were tested:
(a) stabilized cobalt drier in liquid suspension form added to Lorama® alkyd emulsion intermediate (composition as per Example 3.1.1) (collectively, "LDS liquid") and stabilized drier in powder form added to Lorama® alkyd emulsion intermediate (collectively, "LDS powder");
(b) stabilized cobalt drier in powder form added to LPRT™ modified premium high gloss white alkyd enamel (composition as per Example 3.1.2) (collectively, "LDS Powder");
(c) stabilized cobalt drier in powder form added to high gloss black alkyd enamel (composition as per Example 3.1.3) (collectively, "LDS powder");
(d) stabilized cobalt drier in powder form added to LPRT™ modified high gloss black alkyd enamel (composition as per Example 3.1.4) (collectively, "LDS powder") and stabilized cobalt drier in liquid suspension form added to LPRT™ modified high gloss black alkyd enamel (collectively, "LDS Liquid")

The dry times of the Lorama® alkyd emulsion intermediate samples are summarized in the graph in FIG. 4(a). The initial dry time of the standard and the sample with the powder form of the stabilized drier added were similar at first. The dry time of the sample containing the liquid form of the stabilized drier was less than either the standard or the sample with powder form. By the second week, it was apparent that the drying time of the standard was greater than the dry time of the sample containing the stabilized drier. The dry time of the standard continued to increase with longer storage time. After eight weeks of storage, the sample with powder stabilized drier added had a dry time of nearly two hours less than the dry time of the standard. The drying stability provided by the liquid suspension of the stabilized cobalt drier was similar to, if not better than the powdered form of the stabilized cobalt drier.

3.4.2 LPRT™ Premium Modified High Gloss White Alkyd Enamel

Figure 4B:
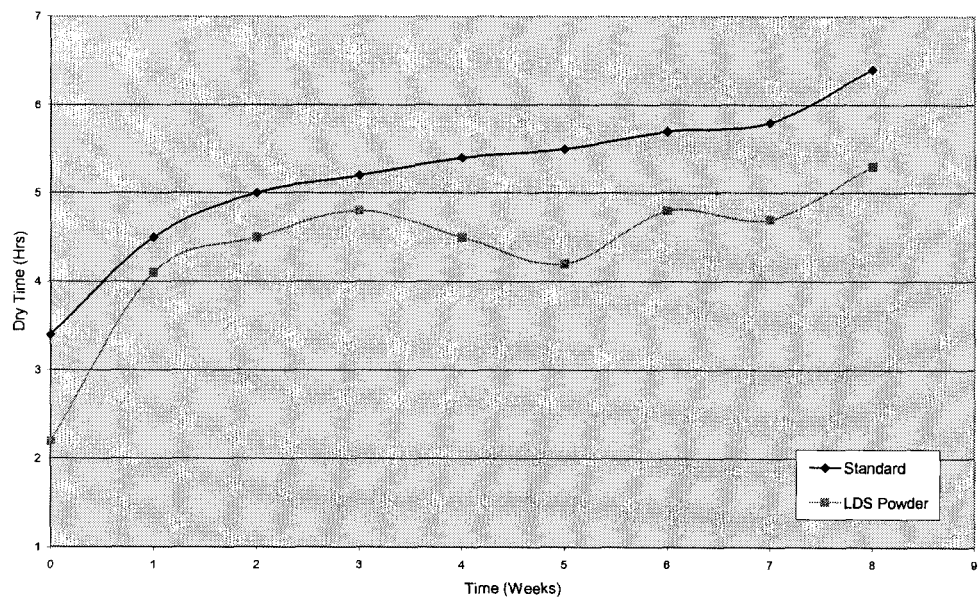

In the samples of LPRT™ modified premium high gloss white alkyd enamel (composition as per Example 3.1.2), the sample with the powder form of the stabilized drier added had a dry time that was about one hour shorter than the dry time of the standard. This sample maintained a shorter dry time throughout the study. After eight weeks of storage, the sample containing the stabilized drier dried one hour before the standard (see FIG. 4(b)).

3.4.3 Black High Gloss Alkyd Enamel

Figure 4C:
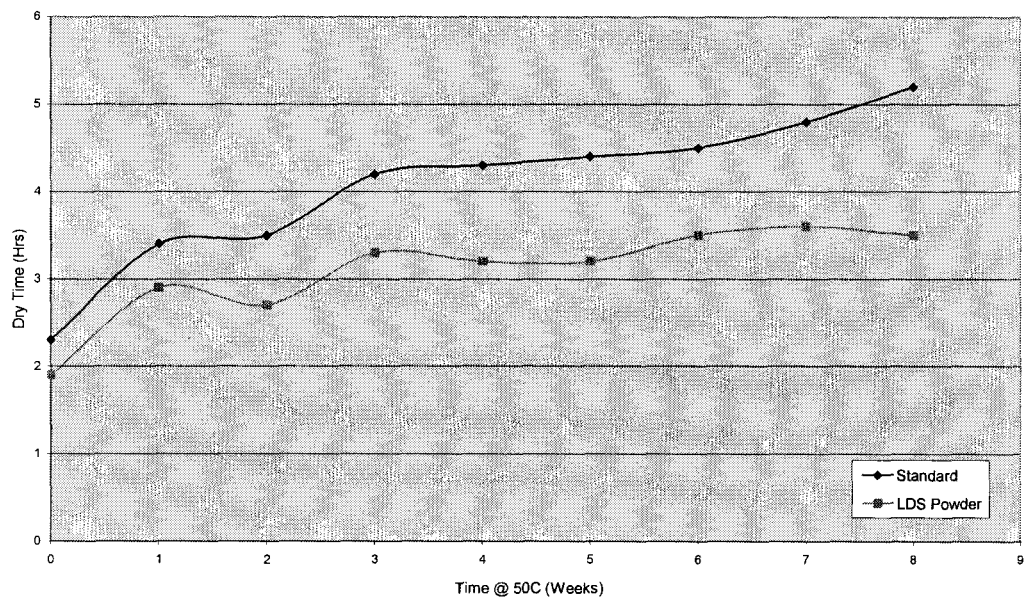

In the samples of the black high gloss alkyd enamel (composition as per Example 3.1.3), the sample with the powder form of the stabilized drier added had a significantly shorter dry time than the standard (see FIG. 4(c)). By the eighth week, the sample containing the stabilized drier dried nearly two hours before the standard.

3.4.4 LPRT™ Modified Black High Gloss Alkyd Enamel

Figure 4D:
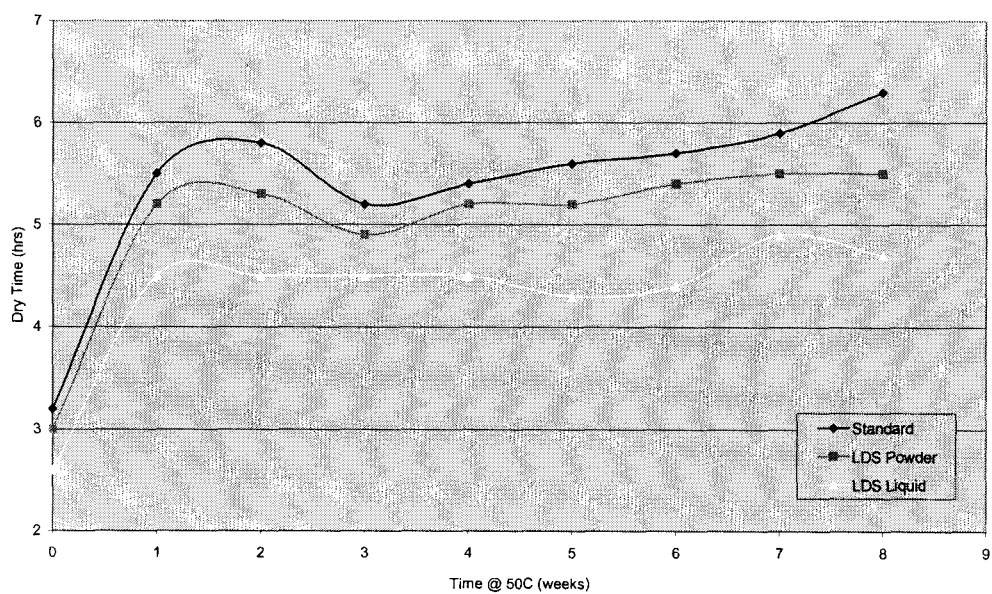

In the samples of LPRT™ modified black high gloss enamel (composition as per Example 3.1.4), the sample wherein a liquid suspension of stabilized drier was added performed better than the powder form of stabilized drier (see FIG. 4(d)). These samples exhibited an improved initial dry time of about 40 minutes less than the standard. After eight weeks of storage, the sample with stabilized drier had a dry time of about 2 hours less than the standard.

3.4.5 High Solids White Alkyd Enamel

Figure 4E:
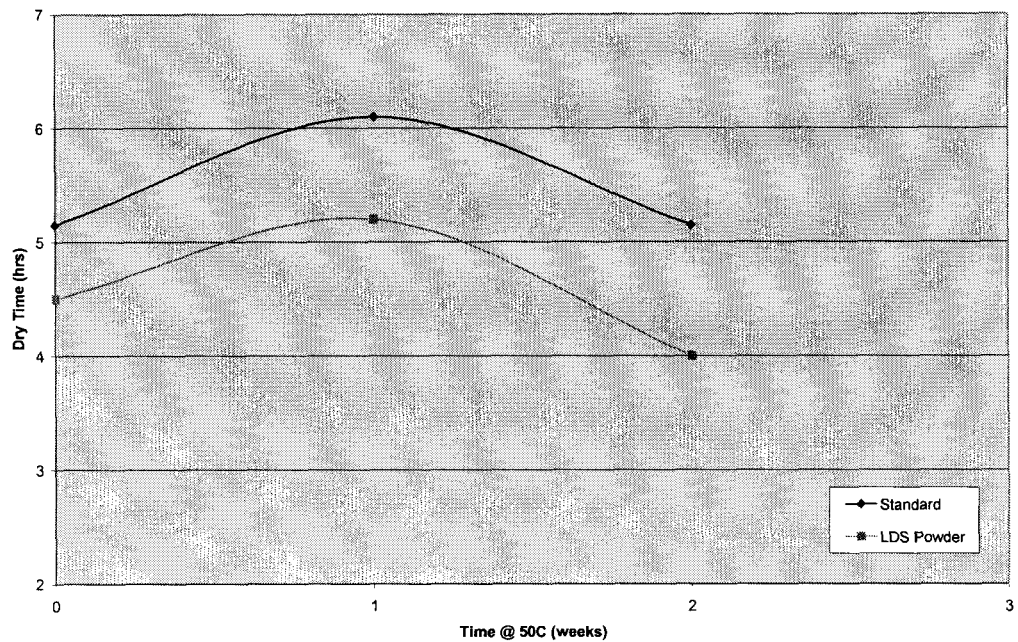

For the high solids white enamel (composition as per Example 3.1.5), the initial dry time of the sample with powdered stabilized drier added, exhibited a dry time of about 40 minutes less than the standard (see FIG. 4(e)). After the first week and into the second week, the sample with the stabilized drier had a dry time that was about 1 hour less than the dry time of the standard.

3.4.6 High Solids Black Alkyd Enamel

Figure 4F:
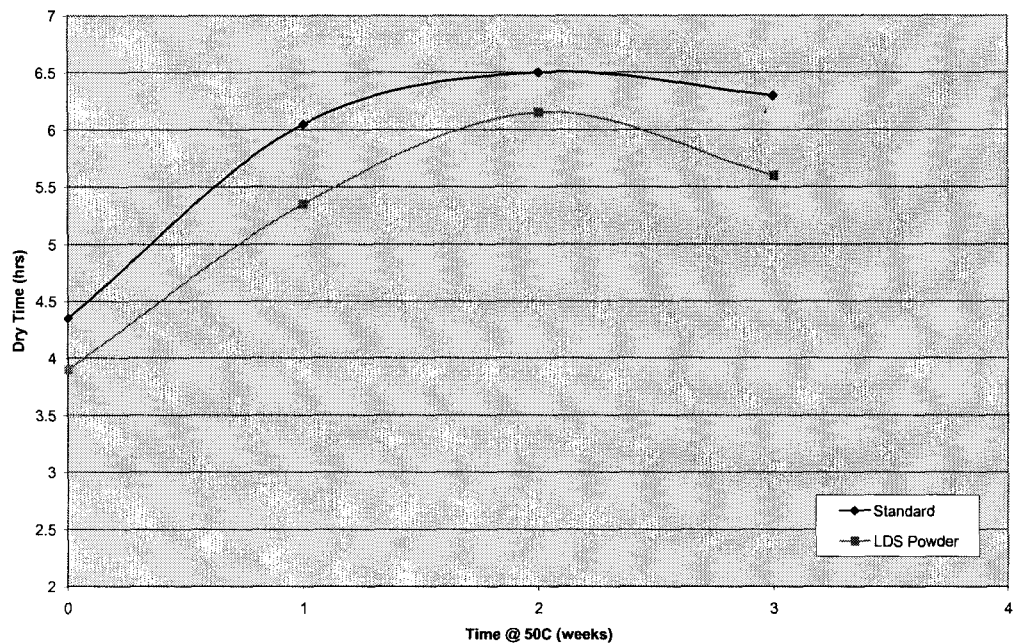

For the high solids black enamel (composition as per Example 3.1.6), the initial dry time of the sample with powdered stabilized drier added, had a dry time of about 30 minutes less than the standard (see FIG. 4(f)). By the third week, the sample with stabilized drier had a dry time of nearly 1 hour less than the dry time of the standard.

3.4.7 Water-based Alkyd Emulsion Enamel

Figure 4G:
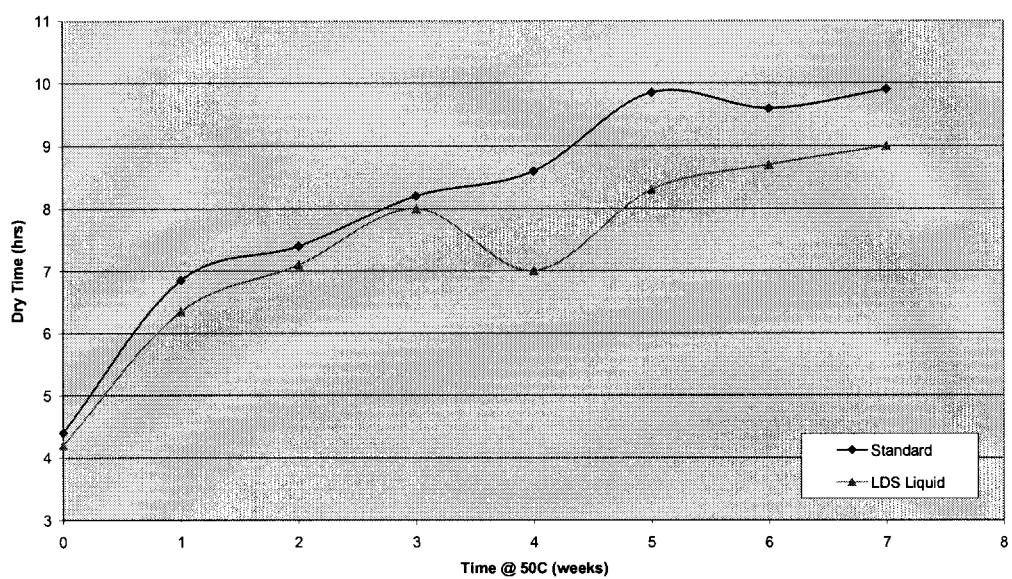

For the water-based alkyd emulsion enamel (composition as per Example 3.1.7), the initial dry time of the sample with a liquid suspension of stabilized drier added was equivalent to the dry time of the standard (see FIG. 4(g)). After four weeks of storage, the sample with stabilized drier had a dry time of about 1 hour less than the dry time of the standard.

The results presented and discussed above illustrate the ability of the stabilized drier to improve the dry time stability of the various alkyd compositions that were tested.

Numerous modifications, variations, and adaptations may be made to the particular embodiments of the invention described above without departing form the scope of the invention, which is defined in the following claims.

We claim:

1. A stabilized drier for an oxidatively air-drying alkyd based composition, the stabilized drier comprising a solid inclusion complex of a cyclodextrin and a metal salt of formula (I):

$$(M^{x+})_k(R^{k-})_x \qquad (I)$$

wherein M is a cation of a metal, with charge x, and R is an anion with charge k, wherein said anion is selected from the group consisting of nitrates, sulfates, phosphates, oxalates, salicylates, carboxylates, naphthenates, an anion of ethylenediaminetetraacetic acid, an anion of diethylenetriaminepentaacetic acid, an anion of nitrilotriacetic acid, amino acids, perchlorates, borates, octoates, resinates, neodecanoates, tallates and linoleates, wherein the inclusion complex is isolated from a hydrophilic environment, and wherein said inclusion complex is adapted to stabilize drying time of an oxidatively air-drying alkyd-based composition.

2. The stabilized drier of claim 1 wherein said cyclodextrin is selected from the group consisting of α-cyclodextrins, β-cyclodextrins, γ-cyclodextrins, and derivatives thereof.

3. The stabilized drier of claim 2 wherein said cyclodextrin is a γ-cyclodextrin or a derivative thereof.

4. The stabilized drier of claim 1 wherein said metal is selected from the group consisting of cobalt, manganese, iron, vanadium, copper, lead, cerium, rare earth metals, zirconium, zinc, aluminum, barium, calcium, bismuth, potassium, strontium and lithium.

5. The stabilized drier of claim 4 wherein said metal is cobalt.

6. The stabilized drier of claim 1 wherein R is an $C_6$-$C_{18}$ aliphatic carboxylate group and k is 1.

7. The stabilized drier of claim 6 wherein R is 2-ethylhexanoate.

8. A process for preparing a stabilized drier for an oxidatively air-drying alkyd based composition, comprising:

(a) dissolving a cyclodextrin in a hydrophilic solvent to form a solution;

(b) adding a metal salt of formula (I):

$$(M^{x+})_k(R^{k-})_x \qquad (I)$$

wherein M is a cation of a metal, with charge x, and R is an anion with charge k, wherein said anion is selected from the group consisting of nitrates, sulfates, phosphates, oxalates, salicylates, carboxylates, naphthenates, an anion of ethylenediaminetetraacetic acid, an anion of diethylenetriaminepentaacetic acid, an anion of nitrilotriacetic acid, amino acids, perchlorates, borates, octoates, resinates, neodecanoates, tallates and linoleates, to the solution of step (a) so that an inclusion complex of said cyclodextrin and said metal salt is formed; and (c) isolating said inclusion complex from said solution to form a solid inclusion complex; wherein said inclusion complex is adapted to stabilize drying time of an oxidatively air-drying alkyd based composition.

9. The process of claim 8 wherein the hydrophilic solvent is water or an aqueous solution.

10. The process of claim 8 wherein said cyclodextrin is selected from the group consisting of α-cyclodextrins, β-cyclodextrins, γ-cyclodextrins, and derivatives thereof.

11. The process of claim 10 wherein said cyclodextrin is γ-cyclodextrin or a derivative thereof.

12. The process of claim 8 wherein said metal is selected from the group consisting of cobalt, manganese, iron, vanadium, copper, lead, cerium, rare earth metals, zirconium, zinc, aluminum, barium, calcium, bismuth, potassium, strontium and lithium.

13. The process of claim 12 wherein said metal is cobalt.

14. The process of claim 8 wherein R is an $C_6$-$C_{18}$ aliphatic carboxylate group and k is 1.

15. The process of claim 14 wherein R is 2-ethylhexanoate.

16. A method for using the stabilized drier according to claim 4, for accelerating oxidative air drying of an alkyd based composition, comprising addition of said stabilized drier to said alkyd based composition.

17. A method for stabilizing drying time of an oxidatively air-drying alkyd based composition, comprising the steps of:
(a) dissolving a cyclodextrin in a hydrophilic solvent to form a solution;
(b) adding a metal salt of formula (I):

$$(M^{x+})_k(R^{k-})_x \quad (I)$$

wherein M is a cation of a metal, with charge x, and R is an anion with charge k, wherein said anion is selected from the group consisting of nitrates, sulfates, phosphates, oxalates, salicylates, carboxylates, naphthenates, an anion of ethylenediaminetetraacetic acid, an anion of diethylenetriaminepentaacetic acid, an anion of nitrilotriacetic acid, amino acids, perchlorates, borates, octoates, resinates, neodecanoates, tallates and linoleates,
to the solution of step (a) to form a mixture comprising a stabilized drier, wherein said stabilized drier is an inclusion complex of said cyclodextrin and said metal salt;
(c) isolating said stabilized drier from said solution to form a solid stabilized drier; and
(d) adding said stabilized drier to said oxidatively air drying alkyd based composition with mixing; wherein said incusion complex is adapted to stabilize drying time of an oxidatively air-drying alkyd based composition.

18. The method of claim 17 wherein the hydrophilic solvent is water or an aqueous solution.

19. The method of claim 17 wherein said oxidatively air-drying alkyd based composition comprises water or a hydrophilic solvent.

20. The method of claim 17 wherein said oxidatively air-drying alkyd based composition is hydrophobic and excludes water or a hydrophilic solvent.

21. The method of claim 17 wherein said cyclodextrin is selected from the group consisting of α-cyclodextrins, β-cyclodextrins, γ-cyclodextrins, and derivatives thereof.

22. The method of claim 21 wherein said cyclodextrin is a γ-cyclodextrin or a derivative thereof.

23. The method of claim 17 wherein said metal is selected from the group consisting of cobalt, manganese, iron, vanadium, copper, lead, cerium and rare earth metals.

24. The method of claim 23 wherein said metal is cobalt.

25. The method of claim 23 further comprising adding an additional metal salt of formula (I) wherein M is selected from the group consisting of zirconium, zinc, aluminum, barium, calcium, bismuth, potassium, strontium and lithium; wherein M is a cation, with charge x, and R is an anion with charge k, wherein said anion is selected from the group consisting of nitrates, sulfates, phosphates, oxalates, salicylates, carboxylates, naphthenates, an anion of ethylenediaminetetraacetic acid, an anion of diethylenetriaminepentaacetic acid, an anion of nitrilotriacetic acid, amino acids, perchlorates, borates, octoates, resinates, neodecanoates, tallates and linoleates.

26. The method of claim 17 wherein R is an $C_6$-$C_{18}$ aliphatic carboxylate group and k is 1.

27. The method of claim 26 wherein R is 2-ethylhexanoate.

* * * * *